US012684373B2

(12) United States Patent
Martin, II et al.

(10) Patent No.: US 12,684,373 B2
(45) Date of Patent: Jul. 14, 2026

(54) TESTING WIRELESS NETWORKS USING OVER-THE-AIR SIGNALS

(71) Applicant: Lutris, Inc., Berkeley, CA (US)

(72) Inventors: James Chillura Martin, II, Berkeley, CA (US); William J. McFarland, Portola Valley, CA (US); Gregory A. Wright, Fair Haven, NJ (US); John C. Wawrzynek, Berkeley, CA (US); Robert W. Brodersen, Berkeley, CA (US)

(73) Assignee: Lutris, Inc., Berkeley, CA (US)

( * ) Notice: Subject to any disclaimer, the term of this patent is extended or adjusted under 35 U.S.C. 154(b) by 356 days.

(21) Appl. No.: 18/538,011

(22) Filed: Dec. 13, 2023

(65) Prior Publication Data

US 2024/0205699 A1 Jun. 20, 2024

Related U.S. Application Data

(60) Provisional application No. 63/498,723, filed on Apr. 27, 2023, provisional application No. 63/432,409, filed on Dec. 14, 2022.

(51) Int. Cl.
*H04W 24/02* (2009.01)
*H04W 24/10* (2009.01)

(52) U.S. Cl.
CPC ........... *H04W 24/02* (2013.01); *H04W 24/10* (2013.01)

(58) Field of Classification Search
CPC .... G06T 13/2025; G10L 15/02; H04W 24/08; H04W 24/02; H04L 1/0047; H04L 65/80; H04L 65/1083
See application file for complete search history.

(56) References Cited

U.S. PATENT DOCUMENTS

| | | | |
|---|---|---|---|
| 4,060,738 | A | 11/1977 | Tasch et al. |
| 4,156,858 | A | 5/1979 | Weckler et al. |

(Continued)

FOREIGN PATENT DOCUMENTS

| | | |
|---|---|---|
| EP | 2680637 A1 | 1/2014 |
| WO | 2011059522 A1 | 5/2011 |

(Continued)

OTHER PUBLICATIONS

May 7, 2024 European Search Report for International Application No. EP 23 21 6392.

*Primary Examiner* — Iqbal Zaidi
(74) *Attorney, Agent, or Firm* — Baratta Law PLLC; Lawrence A. Baratta, Jr.

(57) ABSTRACT

Systems, methods, and non-transitory computer-readable media are provided for testing a wireless network. A method, according to one implementation, includes receiving data captured from monitoring raw signals from one or more wireless networks at a given location; decoding the data to determine messages in the raw signals; analyzing the determined message to determine network parameters that define a status of the one or more wireless networks; and presenting the determined network parameters for the one or more wireless networks at the given location. The monitoring raw signals is performed by a device that excludes a Subscriber Identity Module (SIM). The raw signals include In-phase (I) and Quadrature (Q) components of Over-the-Air (OTA) signals transmitted within a wireless network of the one or more wireless networks, the OTA signals being wirelessly transmitted between a base station and one or more User Equipment (UE) devices.

20 Claims, 13 Drawing Sheets

300

302
RECEIVING DATA CAPTURED FROM MONITORING RAW SIGNALS FROM ONE OR MORE WIRELESS NETWORKS AT A GIVEN LOCATION

304
DECODING THE DATA TO DETERMINE MESSAGES IN THE RAW SIGNALS

306
ANALYZING THE DETERMINED MESSAGE TO DETERMINE NETWORK PARAMETERS THAT DEFINE A STATUS OF THE ONE OR MORE WIRELESS NETWORKS

308
PRESENTING THE DETERMINED NETWORK PARAMETERS FOR THE ONE OR MORE WIRELESS NETWORKS AT THE GIVEN LOCATION

(56) References Cited

U.S. PATENT DOCUMENTS

| | | |
|---|---|---|
| 4,716,312 A | 12/1987 | Mead et al. |
| 4,736,333 A | 4/1988 | Mead et al. |
| 4,736,663 A | 4/1988 | Wawrzynek et al. |
| 5,649,295 A | 7/1997 | Shober et al. |
| 5,649,296 A | 7/1997 | MacLellan et al. |
| 5,689,238 A | 11/1997 | Cannon, Jr. et al. |
| 5,727,052 A | 3/1998 | Sizer, II et al. |
| 5,727,053 A | 3/1998 | Sizer, II et al. |
| 5,760,456 A | 6/1998 | Grzegorek et al. |
| 5,914,946 A | 6/1999 | Avidor et al. |
| 5,995,048 A | 11/1999 | Smithgall et al. |
| 6,021,324 A | 2/2000 | Sizer, II et al. |
| 6,125,172 A | 9/2000 | August, II et al. |
| 6,144,652 A | 11/2000 | Avidor et al. |
| 6,185,418 B1 | 2/2001 | MacLellan et al. |
| 6,243,012 B1 | 6/2001 | Shober et al. |
| 6,380,866 B1 | 4/2002 | Sizer, II et al. |
| 6,389,055 B1 | 5/2002 | August et al. |
| 6,456,668 B1 | 9/2002 | MacLellan et al. |
| 6,597,227 B1 | 7/2003 | Yue et al. |
| 6,677,779 B1 | 1/2004 | Su et al. |
| 6,697,013 B2 | 2/2004 | McFarland et al. |
| 6,721,547 B2 | 4/2004 | Husted et al. |
| 6,807,146 B1 | 10/2004 | McFarland |
| 6,870,815 B2 | 3/2005 | McFarland et al. |
| 6,891,496 B2 | 5/2005 | Husted et al. |
| 6,961,545 B2 | 11/2005 | Tehrani et al. |
| 7,027,530 B2 | 4/2006 | McFarland et al. |
| 7,042,406 B2 | 5/2006 | McFarland et al. |
| 7,120,166 B2 | 10/2006 | McFarland et al. |
| 7,342,414 B2 | 3/2008 | DeHon et al. |
| 7,353,010 B1 | 4/2008 | Zhang et al. |
| 7,385,929 B1 | 6/2008 | McFarland et al. |
| 7,606,193 B2 | 10/2009 | McFarland et al. |
| 7,636,400 B2 | 12/2009 | Thomson et al. |
| 7,643,810 B2 | 1/2010 | Husted et al. |
| 7,764,664 B2 | 7/2010 | Zeng et al. |
| 7,792,052 B1 | 9/2010 | Thomson et al. |
| 7,865,150 B2 | 1/2011 | McFarland et al. |
| 7,904,117 B2 | 3/2011 | Doan et al. |
| 7,912,095 B2 | 3/2011 | Zeng et al. |
| 8,081,878 B1 | 12/2011 | Zhang et al. |
| 8,149,880 B1 | 4/2012 | Cho et al. |
| 8,160,515 B1 | 4/2012 | Husted et al. |
| 8,286,049 B1 | 10/2012 | McFarland et al. |
| 8,391,374 B2 | 3/2013 | Husted et al. |
| 8,416,866 B1 | 4/2013 | Cheng et al. |
| 8,451,918 B1 | 5/2013 | Cheng et al. |
| 8,498,368 B1 | 7/2013 | Husted et al. |
| 8,504,889 B2 | 8/2013 | Husted et al. |
| 8,565,133 B2 | 10/2013 | Chen et al. |
| 8,587,477 B2 | 11/2013 | Samavati et al. |
| 8,675,651 B2 | 3/2014 | McFarland et al. |
| 8,755,756 B1 | 6/2014 | Zhang et al. |
| RE45,236 E | 11/2014 | Husted et al. |
| 9,136,937 B1 | 9/2015 | Cheng et al. |
| 9,753,881 B2 | 9/2017 | Chang et al. |
| 9,935,637 B2 | 4/2018 | Chang et al. |
| 10,051,494 B2 | 8/2018 | Rengarajan et al. |
| 10,057,866 B2 | 8/2018 | Cho et al. |
| 10,178,578 B1 | 1/2019 | McFarland et al. |
| 10,299,405 B2 | 5/2019 | Chang et al. |
| 10,379,584 B2 | 8/2019 | McFarland et al. |
| 10,431,868 B2 | 10/2019 | Samardzija et al. |
| 10,431,869 B2 | 10/2019 | Samardzija et al. |
| 10,433,194 B2 | 10/2019 | McFarland et al. |
| 10,462,929 B1 | 10/2019 | Su et al. |
| 10,470,082 B2 | 11/2019 | Rengarajan et al. |
| 10,554,733 B2 | 2/2020 | Edara et al. |
| 10,777,877 B2 | 9/2020 | Su et al. |
| 11,159,965 B2 | 10/2021 | Goswami et al. |
| 11,234,166 B2 | 1/2022 | McFarland et al. |
| 11,337,086 B2 | 5/2022 | McFarland |
| 11,347,287 B2 | 5/2022 | McFarland et al. |
| 11,398,946 B2 | 7/2022 | Rengarajan et al. |
| 11,445,386 B2 | 9/2022 | Kumar et al. |
| 11,516,802 B2 | 11/2022 | McFarland |
| 11,743,746 B2 | 8/2023 | Agarwal et al. |
| 11,832,170 B2 | 11/2023 | Agarwal |
| 2002/0183027 A1 | 12/2002 | Husted et al. |
| 2003/0058975 A1 | 3/2003 | Baas et al. |
| 2003/0072280 A1 | 4/2003 | McFarland et al. |
| 2005/0157744 A1 | 7/2005 | Barratt et al. |
| 2006/0145775 A1 | 7/2006 | Zhang et al. |
| 2006/0146969 A1 | 7/2006 | Zhang et al. |
| 2007/0238425 A1 | 10/2007 | McFarland |
| 2012/0093240 A1 | 4/2012 | McFarland et al. |
| 2013/0090057 A1 | 4/2013 | Green et al. |
| 2015/0270872 A1 | 9/2015 | Zhang et al. |
| 2017/0127304 A1* | 5/2017 | Britt .................... H04W 24/08 |
| 2017/0272313 A1 | 9/2017 | Rengarajan et al. |
| 2018/0176820 A1 | 6/2018 | Denboer et al. |
| 2019/0007185 A1* | 1/2019 | Cao ....................... H04W 72/51 |
| 2019/0363440 A1 | 11/2019 | Samardzija et al. |
| 2020/0322216 A1 | 10/2020 | Singla et al. |
| 2020/0329384 A1 | 10/2020 | Rusackas et al. |
| 2020/0358189 A1 | 11/2020 | Samardzija et al. |
| 2020/0358196 A1 | 11/2020 | Samardzija et al. |
| 2021/0029559 A1 | 1/2021 | Agarwal et al. |
| 2021/0151875 A1 | 5/2021 | Samardzija et al. |
| 2021/0195442 A1 | 6/2021 | Agarwal et al. |
| 2021/0195443 A1 | 6/2021 | Agarwal et al. |
| 2021/0368362 A1 | 11/2021 | Rengarajan et al. |
| 2022/0102860 A1 | 3/2022 | Samardzija et al. |
| 2022/0279429 A1 | 9/2022 | Agarwal et al. |
| 2023/0020832 A1 | 1/2023 | Hotchkiss et al. |
| 2023/0065256 A1 | 3/2023 | Lu et al. |
| 2023/0146079 A1 | 5/2023 | Jeng et al. |
| 2023/0146463 A1 | 5/2023 | Agarwal et al. |
| 2023/0341503 A1 | 10/2023 | Vidmar et al. |
| 2023/0388329 A1 | 11/2023 | Agarwal et al. |
| 2024/0205699 A1* | 6/2024 | Martin, II ............. H04W 24/02 |

FOREIGN PATENT DOCUMENTS

| | | | |
|---|---|---|---|
| WO | 2014110397 A1 | 7/2014 |
| WO | 2021215195 A1 | 10/2021 |

* cited by examiner

112

110

120

150

160

170

180

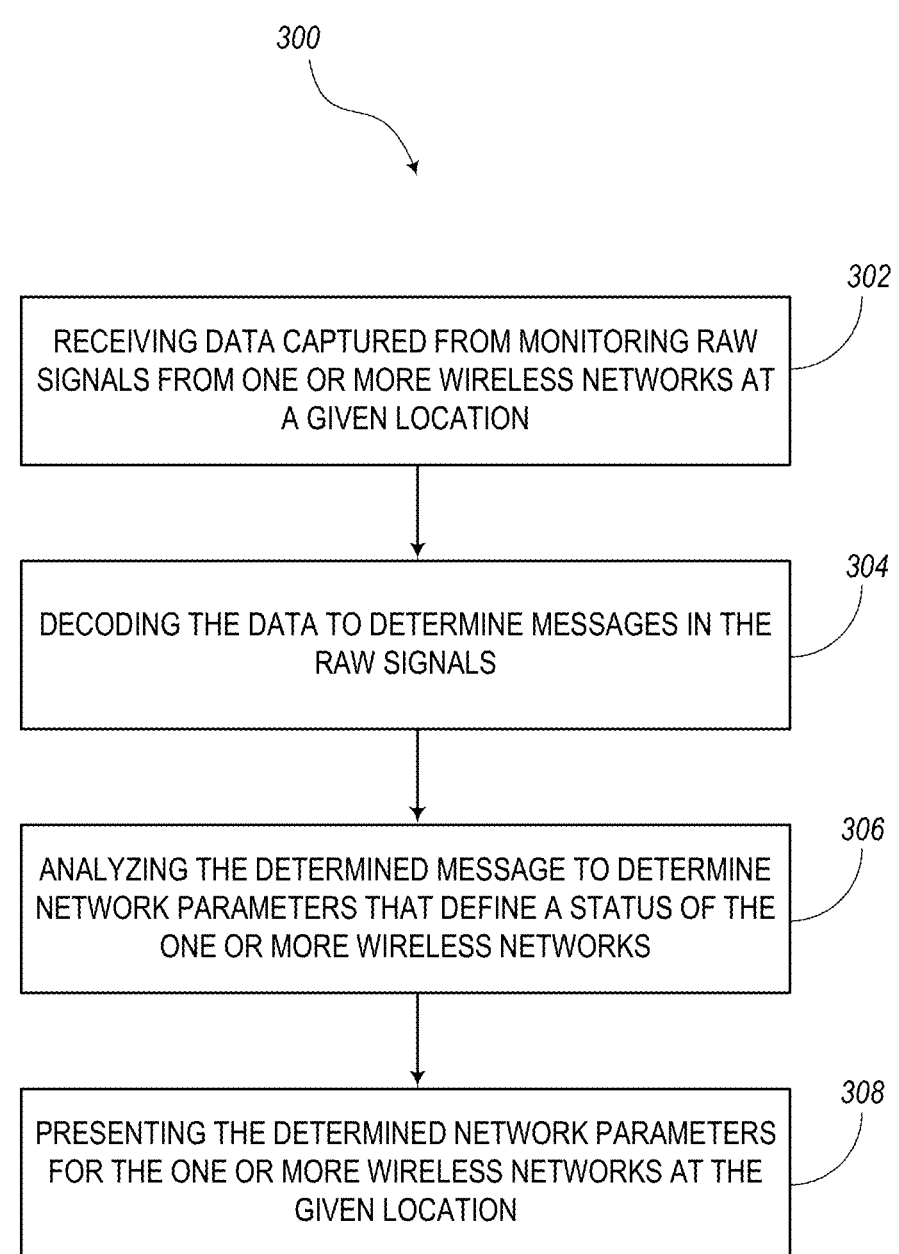

300

RECEIVING DATA CAPTURED FROM MONITORING RAW SIGNALS FROM ONE OR MORE WIRELESS NETWORKS AT A GIVEN LOCATION — 302

DECODING THE DATA TO DETERMINE MESSAGES IN THE RAW SIGNALS — 304

ANALYZING THE DETERMINED MESSAGE TO DETERMINE NETWORK PARAMETERS THAT DEFINE A STATUS OF THE ONE OR MORE WIRELESS NETWORKS — 306

PRESENTING THE DETERMINED NETWORK PARAMETERS FOR THE ONE OR MORE WIRELESS NETWORKS AT THE GIVEN LOCATION — 308

FIG. 19

TESTING WIRELESS NETWORKS USING OVER-THE-AIR SIGNALS

CROSS-REFERENCE TO RELATED APPLICATIONS

The present application claims the benefit of priority to Provisional App. No. 63/432,409, filed Dec. 14, 2022, and Provisional App. No. 63/498,723, filed Apr. 27, 2023, the contents of each are incorporated by reference herein in their entirety.

TECHNICAL FIELD

The present disclosure generally relates to systems and methods for testing wireless networks. More particularly, the present disclosure relates to testing cellular networks using over-the-air signals.

BACKGROUND

Generally, testing of a cellular or Wi-Fi network, such as a Fifth Generation (5G) wireless network, involves expensive test equipment dedicated to specific types of networks. Also, wireless network testing usually involves cooperation among the users on the network, a Service Provider (SP), equipment vendors, etc. and may include disruption of normal network operations. In situations where a local cellular network is being tested, Subscriber Identity Module (SIM) cards installed in mobile phones are typically needed to allow test equipment to access the SP network. That is, the SIM cards have keys that are used for network authentication. There is a need to enable third party testing systems and methods to test wireless networks without the need for cooperative actions by all parties associated with the network, without the need for SIM card authentication, without the need for expensive dedicated test equipment, etc.

BRIEF SUMMARY

The present disclosure is directed to systems and methods for testing wireless networks. Systems, methods, and non-transitory computer-readable media are provided for testing a wireless network, which include steps of receiving data captured from monitoring raw signals from one or more wireless networks at a given location; decoding the data to determine messages in the raw signals; analyzing the determined message to determine network parameters that define a status of the one or more wireless networks; and presenting the determined network parameters for the one or more wireless networks at the given location. The monitoring raw signals is performed by a device that excludes a Subscriber Identity Module (SIM). The raw signals include In-phase (I) and Quadrature (Q) components of Over-the-Air (OTA) signals transmitted within a wireless network of the one or more wireless networks, the OTA signals being wirelessly transmitted between a base station and one or more User Equipment (UE) devices.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 19 is a flow diagram illustrating a method for inspecting OTA signals for analyzing a wireless network.

DETAILED DESCRIPTION

The present disclosure relates to systems and methods for testing wireless networks, such as 5G networks, including both public and private network, etc. One distinction between conventional systems and the systems and methods of the present disclosure is that the embodiments described herein are configured to operate with Over-the-Air (OTA) signals obtained from a network and do not operation in accordance with traditional methodologies that require the a test device being authenticated (SIM card) on the wireless network.

It should be noted that the embodiments described herein, although they may be performed without direct consent with the base station or SP, are of course performed in a manner that not involve unlawful snooping. Instead, the capture and inspection of signals transmitted through the airwaves is intended to be performed by capturing control, diagnosis, metadata, signaling data, etc. and not payload data. The present disclosure includes various techniques to capture this raw data, decoding it into meaningful messages, and analyzing these meaningful messages to determine performance measurements. The present disclosure includes an approach to capture raw data with generic hardware and provide the raw data to the cloud or some other processing system for processing therein.

Communication System

Figure 1:
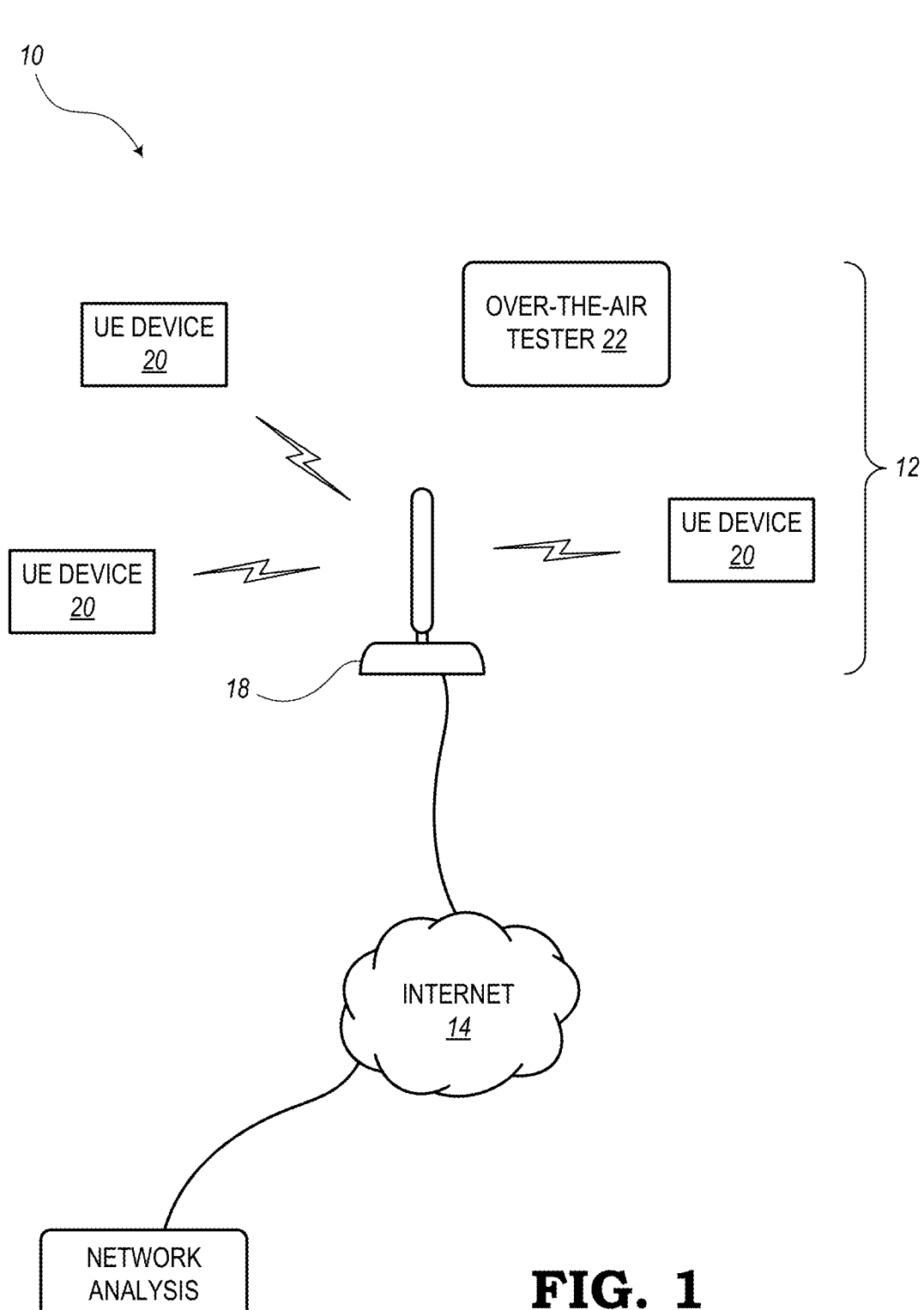
FIG. 1 is a diagram illustrating a communication system in which a network is to be tested.

FIG. 1 is a diagram illustrating an embodiment of a communication system 10 in which a network 12 is to be tested. The network 12 in this embodiment is connected to the Internet 14 or another suitable Wide Area Network (WAN). A network analysis system 16 may also be connected to the Internet 14. Furthermore, the network 12 includes a base station 18, which may be a cellular tower, Wi-Fi access point, an evolved NodeB (eNodeB) transceiver, a Fifth Generation (5G) transceiver, a 5G New Radio (5G NR) transceiver, a next generation NodeB (gNodeB), etc. The base station 18 is configured for wireless (or wired) communication with one or more User Equipment (UE) devices 20 allowing users of the UE devices 20 to access the Internet 14.

In operation, an Over-the-Air (OTA) tester 22 may be arranged in the network 12 or in the vicinity of the network 12. In some embodiments, the OTA tester 22 may be a portable device (e.g., mobile phone, tablet, etc.) that can be positioned so as to intercept OTA signals between the base station 18 and the UE devices 20. The captured OTA signals may include In-phase (I) and Quadrature (Q) components or samples, whereby the I/Q components can be analyzed to decode various parameters of the network 12.

Over-the-Air (OTA) Tester

Figure 2:
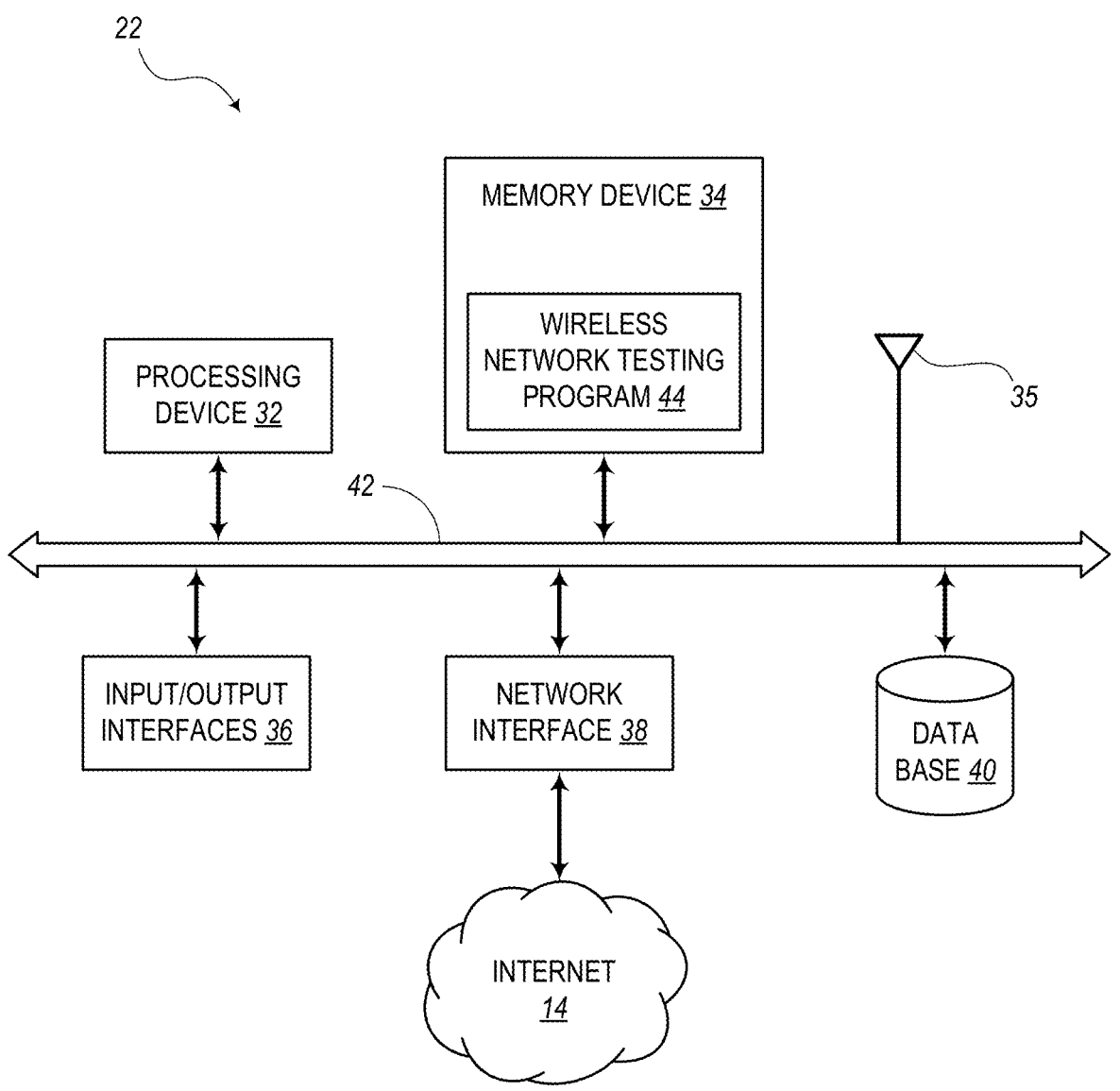
FIG. 2 is a block diagram illustrating the Over-the-Air (OTA) tester shown in FIG. 1.

FIG. 2 is a block diagram illustrating an embodiment of the OTA tester 22 shown in FIG. 1 for localized testing. In the illustrated embodiment, the OTA tester 22 may be a digital computing device that generally includes a processing device 32, a memory device 34, a radio 35, Input/Output (I/O) interfaces 36, a network interface 38, and a database 40. It should be appreciated that FIG. 2 depicts the OTA tester 22 in a simplified manner, where some embodiments may include additional components and suitably configured processing logic to support known or conventional operating features. The components (i.e., 32, 34, 35, 36, 38, 40) may be communicatively coupled via a local interface 42. The local interface 42 may include, for example, one or more buses or other wired or wireless connections. The local interface 42 may also include controllers, buffers, caches, drivers, repeaters, receivers, among other elements, to enable communication. Further, the local interface 42 may include address, control, and/or data connections to enable appropriate communications among the components 32, 34, 35, 36, 38, 40.

The OTA tester 22 further includes a wireless network testing program 44 which may be implemented in any suitable form of hardware (e.g., in the processing device 32) and/or software/firmware (e.g., in the memory device 34). The wireless network testing program 44 may be stored in a non-transitory computer-readable medium (e.g., the memory device 34) and may include logic or computer code having instructions that cause or enable the processing device 32 to perform certain functions, such as obtain OTA signals from the network 12. The radio 35 may be configured to intercept the OTA signals being transmitted across the airwaves within the network 12. In some embodiments, the wireless network testing program 44 may enable the analysis of the captured signals. In other embodiments, the captured OTA signals can be communicated to the network analysis system 16 via the network interface 38 and Internet 14, where the network analysis system 16 can perform decoding of the signals to determine various parameters or characteristics of the network 12.

Network Analysis System

Figure 3:
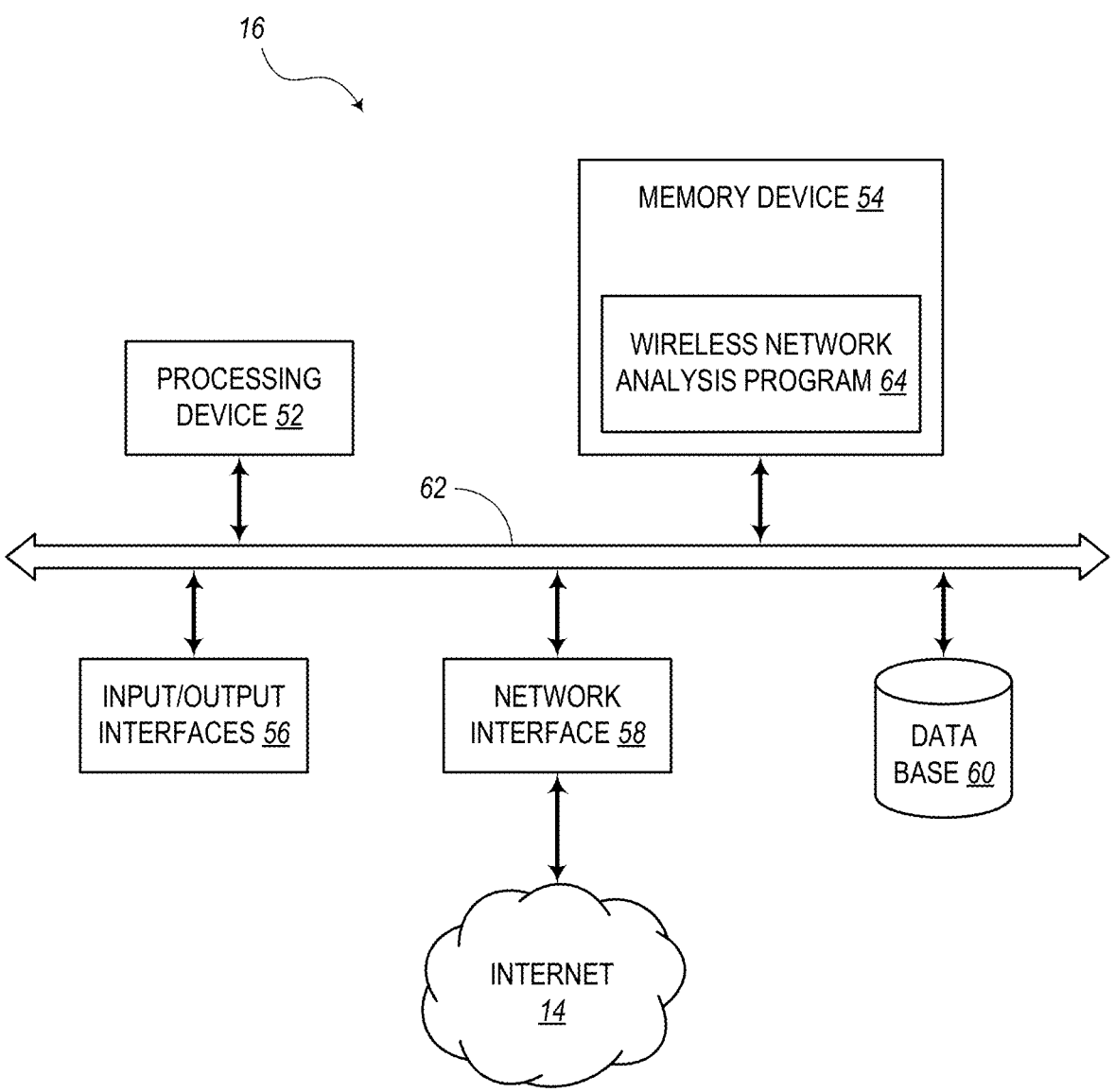
FIG. 3 is a block diagram illustrating the network analysis system shown in FIG. 1.

FIG. 3 is a block diagram illustrating an embodiment of the network analysis system 16 shown in FIG. 1 for remote, cloud-based inspection and analysis of OTA signals obtained by the OTA tester 22 and/or other OTA testers associated with other local wireless networks. In the illustrated embodiment, the network analysis system 16 may be a digital computing device that generally includes a processing device 52, a memory device 54, Input/Output (I/O) interfaces 56, a network interface 58, and a database 60. It should be appreciated that FIG. 3 depicts the network analysis system 16 in a simplified manner, where some embodiments may include additional components and suitably configured processing logic to support known or conventional operating features. The components (i.e., 52, 54, 56, 58, 60) may be communicatively coupled via a local interface 62. The local interface 62 may include, for example, one or more buses or other wired or wireless connections. The local interface 62 may also include controllers, buffers, caches, drivers, repeaters, receivers, among other elements, to enable communication. Further, the local interface 62 may include address, control, and/or data connections to enable appropriate communications among the components 52, 54, 56, 58, 60.

It will be appreciated with respect to FIGS. 2 and 3 that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments with respect to FIGS. 2 and 3 may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Of note, while FIG. 3 illustrates the network analysis system 16 as a single digital computing device, the network analysis system 16 further contemplates operation in the cloud, via Software-as-a-Service, via a plurality of digital computing devices, via a cluster, via any implementation of compute resources known in the art. That is, those skilled in the art will recognize the network analysis system 16 contemplates any practical implementation.

Cellular Wireless Test Capability

Cellular wireless systems have existed for many years. Historically, the deployment of these systems has been done by large service providers (carriers) to obtain coverage over a wide area. Such deployments continue to be made and expanded as new service providers arise and coverage and capacity need to be improved. The concept of private cellular deployments is accelerating the growth in the number of entities deploying cellular systems. These new systems are being installed by private companies, local governments, even individual consumers. The deployments may be located in warehouses, factories, offices, multi-dwelling units (apartment buildings and condominiums), and even private homes. Further, small cell, femto-cell, etc. systems are also being widely deployed. This growth in the number and types of cellular deployments, together with the steady growth of traditional cellular deployments, requires less expensive, simpler, but fully capable test equipment. This document describes systems, methods, and apparatus (collectively called "systems" in this document) that provide novel cellular test capability.

The cellular test systems described here may include the ability to measure a wide range of cellular technologies. Of particular interest are cellular systems matching the 3GPP specifications, ranging all the way from 3G, through 4G, the newer 5G standard, and will continue to be appropriate for 6G cellular technology and beyond. (The acronyms used in this text are defined in the 3GPP specification documents found at www.3gpp.org.) Because cellular systems operate in multiple frequency bands, it is important for the cellular test system to be able to observe signals in a wide range of frequency bands as well. These bands include operation in licensed bands, lightly licensed bands such as the Citizens Broadband Radio Service (CBRS) spectrum, and unlicensed spectrum. These bands are spread over a wide frequency range. What is commonly referred to as the low band starts around 600 MHz or lower and extends to 1 GHz. The mid band, which runs from 1 GHz to 6 GHz includes the C-Band (between roughly 2.4 GHz and 5 GHZ) which is particularly popular for 5G cellular. Cellular systems are also starting to use millimeter wave (mmWave) frequencies, particularly those between 24 and 39 GHz. The systems presented here work equally well at all of these frequencies, and enable the ideal solution, a single system that can test communication infrastructure operating in a wide range of frequencies and be as flexible and general as possible.

Cellular systems can be constructed with a wide range or "scale" of infrastructure. Service providers have typically deployed macro-cells, which can cover square kilometers of cell area, and support hundreds of client devices per cell. However, there is growing interest in microcells or even picocells, which can fill in areas with poor coverage, provide added capacity in large scale cellular networks, or can be used by smaller organizations to build affordable private cellular systems of their own. These smaller systems can consist of a handful of base stations or even just a single base station. A particular company may also have multiple discrete locations across the world, each with cellular base stations which they want to manage and monitor as a single network. The test systems described here are low cost and small in size, yet still provide more detailed analysis than other systems. They are appropriate for measuring all cellular systems, from the simplest to the most complex.

Cellular systems provide powerful networking capabilities, but they are difficult to configure and optimize so that they obtain their maximum potential. This can be particularly challenging for smaller organizations, or those less familiar with cellular technology who are deploying private networks. For convenience we can group many of the challenges into three categories: vendor selection, deployment issues, and operational issues.

The first step for an organization planning a private cellular system is to select a service provider, or potentially to select equipment for deploying their own system. When considering a service provider, the organization should assess how well the service provider's network will perform in their particular location. An inexpensive, portable piece of test equipment is required to measure adequate coverage (signal strength) across locations. In addition to signal strength, it is desirable to check the channel conditions to understand which modulation rate, and what multi-antenna configuration, or as it is usually called, Multiple Input Multiple Output (MIMO), dimension can be supported at the locations in their environment. Another factor that affects the performance that can be achieved in a particular environment is the load present at the base station(s) serving the area. Also, some cellular systems work well with particular client devices ("user equipment" or UEs) but not for other UEs. Test equipment that can observe the behavior of the proposed service provider with a variety of client devices can help an organization choose the best service provider considering the organization's UE base.

Many of the same measurements are valuable if the organization is purchasing equipment to build their own private network. Different infrastructure hardware may have different coverage, throughput, MIMO capabilities, etc. The same holds true if the organization is going to be purchasing their own clients, perhaps specialized for monitoring manufacturing processes or keeping track of inventory.

In the case that an organization is deploying its own private network, after selecting the equipment, a deployment must be planned. Measurements are required to correctly and accurately determine the number of base stations required and where they should be located. Deployment planning requires taking measurements at the locations where clients are most likely to be present, and where the base stations might be placed. The measurement system needs to record not only the signal strength, but also all aspects of the channel, including supportable Modulation and Coding Scheme (MCS), MIMO dimension, and the presence of any interference that may be present. By testing several proposed locations for the base stations, it will be possible to choose those that have favorable channel conditions and maximize throughput and capacity.

The organization will also need to make decisions about which frequency bands should be used. The choice of frequency bands depends sensitively on the interference levels in each band coming from other cellular systems that might be present nearby. It also is affected by the frequency band capabilities of the client devices that the organization wants to support. It is also informed by the availability of frequency spectrum from a financial point of view. Most of the frequency spectrum requires a license, which must be purchased from a regulatory body. In the US, that would be the FCC. Carrier aggregation capabilities complicate these decisions, as interference across all the aggregated carriers needs to be considered. Interference can come not only from other cellular systems, but depending on the frequency band used, particularly unlicensed bands, other radio transmissions such as Wi-Fi. And many radio transmissions may make noise in bands where they are not operating due to harmonics (non-linearities) generated in their transmitters and other out-of-band emissions. The test equipment described here can measure all the different types of interference and noise, even identifying the particular type.

Organizations will have to configure other aspects of their deployments. Selections can be made regarding the types of protocol headers and the MCS tables to use. Adjusting these requires trading off factors including range, doppler, throughput, robustness, and system capacity. The selections are specific to a particular environment and its channel conditions, as well as the behavior (for example movement and location) of the client devices.

Other configurations are less performance oriented, but more about basic system behavior and feature enablement. For example, the Public Land Mobile Network (PLMN) identifier needs to be set correctly. Both 4G and 5G versions of the 3GPP specifications have a large number of releases with different features, as well as optional features. Which features should be enabled in a given environment depends on several factors, such as channel conditions and interference, as well as client capabilities. Organizations need test equipment that provides these measurements.

After deployment of the cellular system, operational issues can come up and need to be managed. The radio environment is fundamentally dynamic, so measurements made during selection and deployment of the network need to be repeated periodically. Client connectivity issues are one of the issues that can arise and should be observed and reported. These client connectivity issues can be associated with roaming (handoff) events, or initial association. Interference can come and go as the load on neighboring networks varies. Some cellular networks are deployed with dynamic frequency and band capabilities, and new neighboring private cellular systems may be deployed. Interference from other cellular systems, or non-cellular radio systems should be monitored on an ongoing basis, and the operation of the private cellular network adjusted to avoid the interference. Other issues that can arise during operation include capacity limitations, and performance limitations or misbehavior of particular clients.

To summarize, organizations deploying or selecting private cellular networks need measurement systems that can perform all of the measurements listed above. The following list of specific issues that must be addressed are examples of the measurements and diagnosis available from the measurement systems described in this document:

Inconsistent versions or incorrectly selected optional features of the 4G and 5G 3PP standard Incompatible implementation of portions of the 4G and 5G specification, between different base stations in the system, or between the base stations and the client devices Poor allocation of CBRS spectrum by SAS (Spectrum Access System) vendors Poor selection of frequency bands of operation, perhaps inconsistent with clients or heavily congested spectrum Insufficient base stations to achieve adequate coverage Poor placement of base stations resulting in poor MIMO performance due to poor channel conditions Poorly implemented algorithms at the PHY (Physical) layers that do not achieve high throughput to individual clients, or high capacity of the overall system that should be possible based on the channel conditions present Poorly implemented algorithms at the Media Access Control (MAC) level, for example inefficient scheduling of traffic The test measurement systems described in this document can be used by network planners and operators (for example large service providers), IT managers of private cellular deployments, or even consumers for selecting the best service provider for their location. That is, while some examples described private cellular deployments, the present disclosure contemplates use with any type of wireless network.

Limitations of Existing Cellular System Test Methods

Conventional cellular test systems utilize approaches that limit their ability to provide the measurements described previously. A common approach is for the base stations themselves to make measurements or gather statistics. However, this has a number of limitations. Base stations utilize their own radio systems to communicate with clients. Therefore, they typically only make measurements in the bands/frequencies in which they are operating. This makes it impossible to tell if there is a better frequency or band to operate on. Because the base station cannot dynamically jump off channel to measure in a different frequency range without interrupting the flow of traffic, it cannot determine the relative interference or noise levels in other frequencies.

Measurements performed at the base station also are not able to see the conditions where the clients are located. For example, localized interference cannot be sensed accurately at the base station. Instead, a test device must be placed near to where the client device will be operating to see the strength of localized interference or noise at that location.

Measurements performed at the base stations also cannot predict where there is poor coverage. Devices in those areas will not connect to the base station, so only by putting a piece of test equipment in those locations can bad coverage holes be discovered.

There are dedicated cellular test instruments available, which can be moved to the position of client devices to make measurements. However, these instruments have their own sets of limitations. They are very expensive, perhaps practical for a large service provider performing drive tests, but impractical for a company deploying private cellular in a factory, warehouse, or office building. These dedicated test instruments do not make the raw I/Q sampled data available for post processing. Using these devices, a network manager gets only the analysis and information that the test equipment provides. They cannot analyze the data in unique ways or for other properties. Additionally, they are hard to update. Generally, you cannot add new measurement capabilities to the instruments that are already in the field. Finally, the entire instrument generally needs to be replaced to add the capability to make measurements in a new or additional frequency band.

Another problem with current measurement instruments is the use of standard client (UE) or base station chipsets to form the foundation of the instrument. This includes the use of software on a cell phone for example, but also applies to the construction of some dedicated test instruments as utilizing a standard cellular chipset can make development faster and less expensive. However, this results in a number of limitations and inconveniences. For example, when trying to make measurements with standard cellular chipsets, detailed measurements can only be made on systems for which the equipment is provided a Subscriber Identity Module (SIM card). This requirement is administratively inconvenient, as when moving from one network to another, a different SIM card is required at each location. And if a third party is performing the measurements, they need to obtain a SIM card from the network owner before measurements can take place. Such a test system also can make only very simple basic measurements regarding a potentially interfering neighboring network.

More fundamentally, cellular chipsets do not report the details required to make a good test instrument. They do not report details of the channel estimates, making it impossible to derive the expected MCS, MIMO level, throughput, or system capacity. They do not report scheduling information or estimates of the load on the cellular network. Packets that have protocol errors, or some type of errors in the header are ignored, rather than reported and analyzed for being in error. Some cellular chipsets will report the Signal to Interference plus Noise Ratio (SINR), which gives some indication of the level of interference. However, they do not distinguish between cellular interference or interference from another noise source such as Wi-Fi, and they don't identify what is causing the interference. They also do not find the direction to or location of the interference, making it difficult or impossible to resolve the problem.

Current cellular test equipment, whether based on cellular chipsets or custom logic, is missing key algorithms to enable decoding messages that are not intended for the testing system. Some of the key algorithms include the ability to descramble the pilot tones. These scrambling patterns are unique to each client device. Traditionally the scrambling pattern is provided to the intended recipient, but not to other devices. Similarly, message headers are encoded, with the required decoding information for a set of packets provided only to the intended recipient. As will be shown in this invention, algorithms can enable the descrambling and decoding of these messages.

Another missing set of algorithms is associated with receiving uplink messages from multiple client devices at a location away from the base station. In cellular systems, uplink messages are time aligned and power controlled to enable reception of the signals at the base station. However, if a piece of test equipment is placed at a location other than the base station, the signals are no longer properly time aligned or power controlled at the measurement location. Being able to receive the uplink traffic, enabling analysis and deep understanding of the operation of the network is important for monitoring the network and client devices. However, with the algorithms described later, it is possible to receive these uplink signals at any location that provides sufficient signal strength on all the uplink transmissions.

Another fundamental limitation of current cellular test systems is that the results are stored and displayed locally on the test instrument. This makes it difficult for more than one person to view the results, or for people in remote locations to see the results. Some test instruments will allow the exporting of measurement results, but only of the processed results. This makes it difficult to compare measurements at different times and places or apply techniques such as machine learning or deep learning.

Network Testing System

Figure 4:
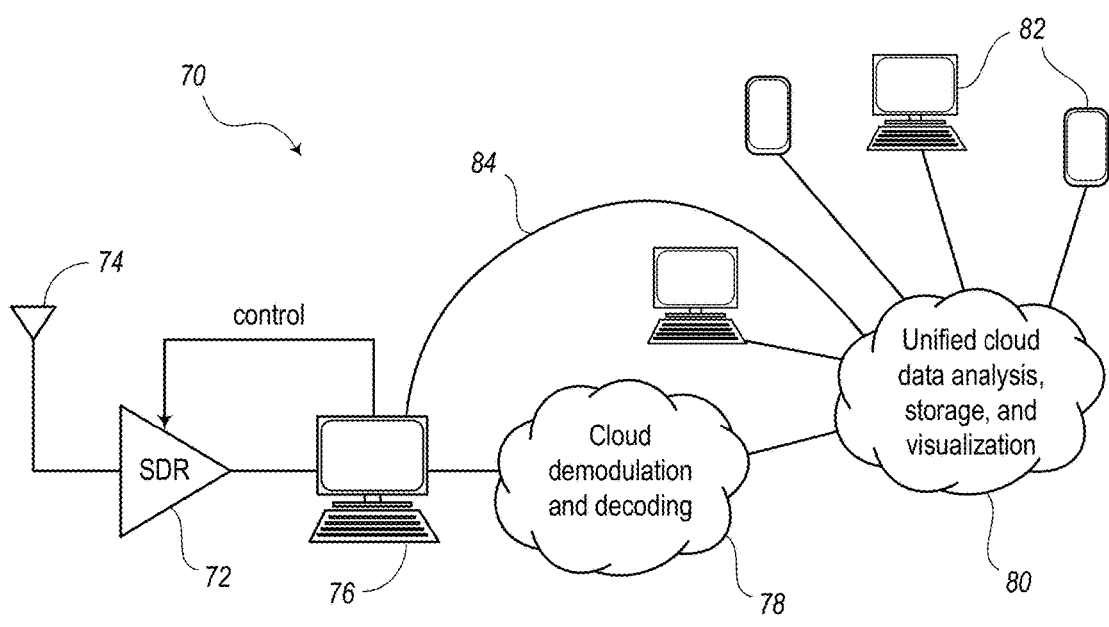
FIG. 4 is a diagram illustrating a network testing system.

FIG. 4 is a high-level block diagram illustrating an embodiment of a network testing system 70 or cellular measurement system. In this example embodiment, the network testing system 70 includes a Software-Defined Radio (SDR) 72 having an antenna 74 for capturing wirelessly transmitted signals. The received signals are provided to a computing system 76 (e.g., computer, mobile phone, laptop, tablet, etc.). The computing system 76 may process the signals to obtain valuable data that can be used to decode various parameters of a local wireless network in which the network testing system 70 is positioned. The valuable data is provided to a cloud demodulation and decoding system 78 ("cloud" 78). Demodulated and decoded signals are then forwarded to a unified cloud data analysis, storage, and visualization system 80, which may further be configured to obtain similar demodulated/decoded sets of signals from other computing systems associated with other wireless networks. The unified cloud data analysis, storage, and visualization system 80 may provide results back to the computing system 76, wherein the results may be presented to a technician using the computing system 76 using any suitable I/O device, such as a User Interface (UI), Graphical User Interface (GUI), etc. Thus, the technician can be informed of various network status information. In some embodiments, computing system 76 may provide feedback control to the SDR 72 to adjust as needed to obtain optimized data from the wireless network being tested.

In some embodiments, the test system 70 utilizes a Software Defined Radio (SDR) 72. Software Defined Radios are known in the art for capturing raw I/Q samples of a portion of the radio spectrum. They are generally programmable over a wide frequency range, for example from 500 MHz to 6 GHz, or even into the mmWave spectrum. In this implementation, the SDR 72 is controlled by software running on the computing system 76. The computing system 76 also captures the I and Q samples from the SDR 72. Because SDRs often have poor channel filtering, there may be artifacts from adjacent channel interference, or from signals at the image frequencies of the SDRs local oscillators. There also may be I/Q phase or amplitude imbalance, distorting the desired signal, or placing an image from another part of the spectrum over the desired part. In some embodiments, the computing system 76 applies signal processing (filtering), carefully chooses the local oscillator frequencies used in the SDR to receive a particular signal, and applies intelligent cancellation of signal impairments, for example those coming from I/Q phase or amplitude imbalance.

Many SDRs are relatively limited in the bandwidth of the signals that they can capture. The cellular test system 70 can compensate for this by making multiple sub-band captures. In this method, measurements are taken sequentially, each over a different portion of the desired channel. After all the captures are complete, the signal can be put back together to form a single sample of the entire bandwidth. Several steps are key to this being successful. First, it relies on the fact that there are cellular signals that are repeated across time. The system discovers these repetitive signals and uses them to align the different samples in time. Second, the oscillators in the transmitter and receiver may drift over time, causing minor frequency differences in the multiple samples. This is compensated for by tracking the phase/frequency of each captured frequency segment separately and correcting for those offsets independently. With the time and frequencies realigned, the signals can be combined by frequency shifting (mixing) the signals into the right relationship to one another and adding the samples into a single data stream.

The use of a computing system 76 to control the SDR 72 and capture the I/Q samples enables a small, portable, battery powered test system. The computing system 76 also has the capabilities required to access the cloud 78 to upload the captured data, and to display the results of data analysis in real time that is done in the cloud 78. In some embodiments, pre-processing is performed on the computing system 76 to filter and cancel signal impairments. It may also do decimation or sample reduction, as well as signal quantization or compression. The computing system 76 may perform further lossless or lossy compression of the captured data before moving it to the cloud 78.

In one embodiment, the I and Q samples (perhaps filtered and compressed as described above) are moved to the cloud 78. In the cloud 78, the signals are demodulated in software running on standard servers. The number of servers employed for demodulating can be scaled dynamically using known dynamic cloud scaling techniques. This scaling can be used when a more difficult signal to demodulate is encountered, or when the demodulation of multiple signals in parallel is desired.

5G NR Transmission Decoding

Figure 5:
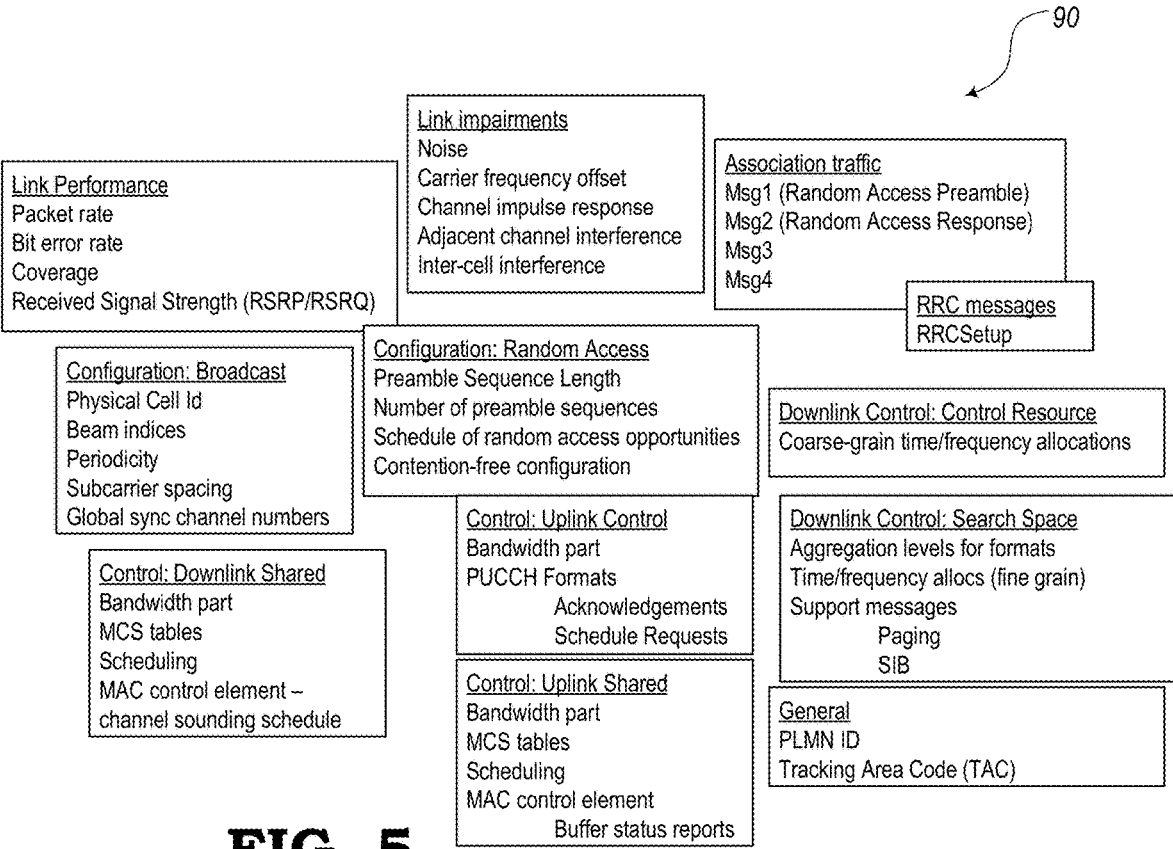
FIG. 5 is a block diagram illustrating a Fifth Generation (5G) New Radio (NR) transmission decoding system.

FIG. 5 is a block diagram illustrating an embodiment of a Fifth Generation (5G) New Radio (NR) transmission decoding system 90. FIG. 5 shows information that can be extracted from the I/Q samples. Working from I/Q samples, together with large amounts of processing power in the cloud 78 enables the extraction of virtually all protocol, modulation, and physical layer information associated with the captured transmission.

The decoding of cellular signals is practiced in all cellular handsets. However, the illustrated embodiment has the novel capability of doing this without the information (credentials) that would be provided by a SIM card as would be present in a handset or other cellular client. Among the information missing when there is no SIM card are the message length, message format, message scheduling, and the Radio Network Temporary Information (RNTI). Algorithms that enable determining each of these are shown in detail later in this document. Using a combination of observations from transmissions to other clients in the network, uplink network traffic, and some search algorithms, the necessary information to successfully decode the signal can be extracted.

In one embodiment, cloud software updates are used to enhance the capabilities of the system. These include the demodulation of more types of cellular signals, as well as the extraction of more key metrics from the demodulated signals. In some embodiments, most of the processing occurs in the cloud 78, so a single cloud software update enables new features for any number of test systems in the field. The software on the computing system 76 only performs preprocessing, and even that is updated more easily than software buried in a dedicated test instrument.

In one embodiment, along with displaying information from individual messages, accumulated statistics can be delivered to the user. These statistics can be used to compare the behavior of different types of client devices, or different types of base stations. It also can be used to compare behaviors in different locations.

The illustrated embodiment uses the physical layer, modulation, and protocol information to calculate high level performance related metrics. One such category of metrics is system capacity. Included in this category are the maximum supportable MCS, as well as the maximum supportable MIMO. Both of these can be calculated by deriving the Channel State Information (CSI or channel estimate) from the I/Q samples. The CSI can be used to determine the rank of the channel (or channel condition number) which provides the MIMO capability. The CSI can also be used to understand multipath scattering in the channel. When combined with the signal strength information, this enables determining the MCS that can be supported. These derivations are accurate and fundamental. The throughput and system capacity calculated in this way could be degraded by other impairments that affect the packet error rate (PER), such as interference. These other impairments can be assessed separately once the theoretical system capacity is known.

In addition to the channel capacity, the measurement system can calculate the achievable throughput given the load on the network. This calculation starts with the theoretical system capacity but reduces it according to the load on the base station to which a client is connected. Base station load can be determined from several metrics. Because the measurement system captures all transmissions in the given spectrum, air time utilization can be observed for each base station. There are also cellular statistics, such as RSRQ (reference signal received quality), that can be used to estimate the load on the cell. This is possible because the RSRQ diverges from the RSRP (reference signal received power) as the load in a cell is increased. The measurement system can also observe the response of the base station to traffic requests from clients, which factors not only the actual load in the cell, but how the scheduler within the base station is able to accommodate those requests.

The illustrated embodiment analyzes interference in detail. Working from the I/Q samples, the interference signals can be isolated from the cellular signals through iterative signal subtraction, filtering, or other means known in the art. This allows detailed analysis of the interference signal by itself. The illustrated embodiment extracts the strength of the interfering signal, the amount of time the signal occupies the channel, and the frequencies occupied by the interference. Further analysis determines the type of interference by categories, such as Wi-Fi, Bluetooth, in-system cellular interference, or foreign cellular interference. Signal identification is done using statistical properties of the signals, as well as by attempted demodulation of known signal types. When a known signal type can be demodulated, additional information can be provided to the user about the source of the signal, such as the MAC address, type of device generating the interference, or other individual device identifying information.

Along with providing feedback regarding the performance of the network, the illustrated embodiment provides feedback regarding the configuration of the network. If the system has multiple base stations, the measurement system observes the synchronization of the base stations and can report if one of them is in error relative to the others. The test system measures preamble settings and selections and can indicate if they are optimum for the actual observed range to clients and motion (leading to doppler shift in frequency) of clients. The measurement system also reports observed Public Land Mobile Network (PLMN) identifiers, the 4G and 5G optional features that are enabled, the MCS tables configured, and the carrier aggregation and its use. In many systems the operator chooses the number of random access channels that are allocated. This choice also represents a tradeoff in performance depending on whether the network has many or few clients joining it. The illustrated embodiment analyzes these settings and makes recommendations for optimization.

Along with reporting these and any related statistics, the illustrated embodiment can make recommendations. These recommendations may stem from direct analysis. However, the illustrated embodiment makes use of the data that has been moved to the cloud from any number of test systems to perform machine learning. Machine learning can be used to discover anomalous configurations or behaviors in outlier networks. It also can be used to correlate the level of performance achieved in a network versus the configuration or operational statistics including number of base stations, signal strengths, etc.

Ultimately users of a network experience that network through specific client devices. Therefore, the illustrated embodiment tracks individual clients and analyzes their behavior on the network. All of the following behaviors are identified: slow or failed initial association, roaming/handoff problems or delays, clients consuming excessive resources or using resources inefficiently, and clients that choose to operate in inappropriate bands or with sub-optimal modes (4G vs. 5G, various optional features). It also can identify devices that are suffering from a particularly high packet error rate. These results can be shown as overall statistics or can identify specific individual devices that require attention.

The illustrated embodiment provides access to the analyses just described as well as the base I/Q samples, the raw samples demodulated, and the decoded information to any number of users in any number of locations through the web interface. Multiple users can access the data at the same time through the web interface. Login credentials are used to limit what data particular users can see. The limitations can include what type of data/statistics, low level versus high level derived results, or some portion of the networks whose data is in the cloud 78. Data clouds can be multi-tenant, holding the data from multiple different organizations, or single tenant completely isolating the data from one organization to the next.

The illustrated embodiment includes localization of signals. This is a great benefit to system operators, whether the localization is of interfering devices, noise sources, poorly behaving clients, or UEs or base stations in neighboring systems. Localization can be performed with any number of triangulation or direction-of-arrival methods, preferably in combination. Multiple antennas on a SDR in the test system can be used to determine angle of arrival based on the phase of signal arrival at the antennas. Information from multiple test systems can be combined to do multi-hypothesis triangulation on signal strength, angle of arrival, or time of arrival between the different test systems. A single test system can also be used across time as it is moved or rotated to determine the location of the signal in question. This localization could be done for multiple devices simultaneously, distinguishing the devices from each other by an identifier that is available in the particular protocol such as the media access (MAC) address for Wi-Fi or the Radio Network Temporary Identifier (RNTI) for cellular.

Decoding Messages without Information from a SIM Card

Figure 6:
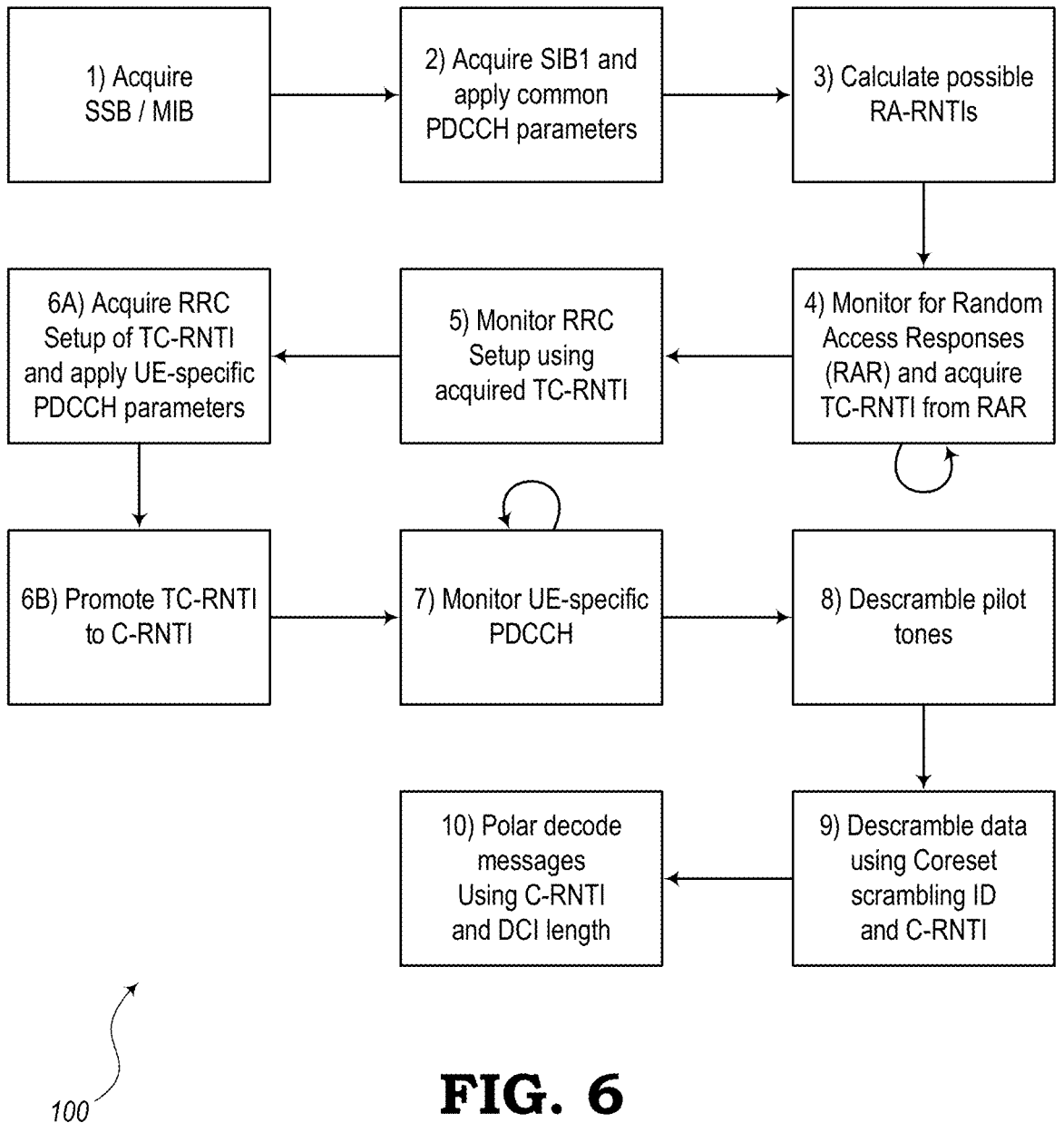
FIG. 6 is a flow diagram illustrating a method for decoding wireless transmissions.

FIG. 6 is a flow diagram illustrating an embodiment of a method 100 for decoding wireless transmissions, according to various embodiments. The method 100 describes an embodiment of how to acquire control information available in the downlink without having associated with the network, i.e., without a SIM card. Downlink control acquisition involves the following series of steps:

0. Initialize the set of known TC-RNTI to empty. Initialize the table of known C-RNTI to empty. Proceed to step 1.

1. Acquire the synchronization block (SSB), which includes the master information block (MIB). Proceed to step 2.

2. Monitor search space zero using the information from the MIB to acquire the system information downlink control information (DCI) and using the contents of that message acquire the SIB1. Determine and apply the parameters for the physical downlink control channel (PDCCH) that corresponds to the common control space. Proceed to step 3.

3. Using the information pertaining to the physical random access channel (PRACH) from the SIB1, calculate the possible random access radio network temporary identifiers (RA-RNTI). Proceed to step 4.

4. Using the parameters from step 2, monitor the appropriate search space for random access responses monitoring for the calculated RA-RNTIs in step 3. For every RA-RNTI DCI received, if the message is a random access response uplink grant, then add the corresponding temporary cell radio network temporary identifier (TC-RNTI) to the set of TC-RNTI. Repeat step 4 (and simultaneously advance to step 5).

5. Monitor the appropriate search space determined from step 2 for messages that correspond to the set of known TC-RNTI. If a match occurs, proceed to step 6. Otherwise, repeat step 5.

6. If a message is received using a known TC-RNTI and is an RRCSetup, promote the TC-RNTI to cell RNTI (C-RNTI). Add the UE-specific parameters to the table of C-RNTI using the C-RNTI as the key. If this is the first RRCSetup in the table, apply the UE-specific parameters to enable monitoring of UE-specific search spaces. If this is not the first RRCSetup message, add any new additional parameters to those that are needed for UE-specific search spaces.

7. Monitor the UE-specific search spaces for energy that is sufficiently above threshold, then simultaneously repeat step 7 and advance to step 8. Otherwise, repeat 7.

8. Using the parameters determined from step 6, search the possible aggregation levels. If there is sufficient energy, descramble the pilot tones using the scrambling id known from step 6. If the phase error between adjacent subcarriers is too significant, apply descrambling as described herein under the descrambling pilot tones section. Proceed to step 9.

9. For every entry in the C-RNTI table, descramble using the scrambling ID and C-RNTI and decode the control message using the C-RNTI and possible DCI lengths. Proceed to step 10 for each possibility.

10. If the CRC is equal to the C-RNTI, consider the message tentatively decoded. Moving tentatively to successfully decoded is discussed later.

Decoding UE messages where we did not observe the association or whose C-RNTI changed during normal operation:

Steps 7 through 10 may also brute force search the entire space of C-RNTI. In practice, the number of possibilities is small ($2^{16}$).

There are various DCI formats and lengths possible, but we initially start with DCI lengths and formats that were determined from previously seen RRCSetup. If there is still a failure to decode, we then start searching among the possible DCI formats (and their corresponding lengths). We order the search in the likelihood of change between the relationship of the network and the UE (e.g., searching for a format where a secondary cell was added to the cell group before searching if a new bandwidth part was added).

Base station specific observations may also be used to improve the search. For example, some base stations have a limited range of values for C-RNTI. Other base stations may be too far away from other secondary cells, which may be determined from system information messages.

Past configuration history for a given base station may also be leveraged removing the need to acquire RRC-Setup and SIB1. If this does not work, then one may fall back to the previously described methods of acquisition.

Determining if a Message is Successfully Decoded

Even if the message is tentatively decoded, it is possible to either have a false positive or for the message format to be misinterpreted. To detect both, a few properties can be relied on such as:

Frequency allocations for two different DCI messages may not overlap for the same slot.

If a C-RNTI is present, it is likely that there will be multiple DCI messages sent within a given time period with the same C-RNTI. A C-RNTI that appears very infrequently (e.g., once every two minutes) is likely not a valid C-RNTI.

Many fields of the DCI message will be either time invariant and/or UE invariant for a given time span. If such a field is seen to be different from previously seen messages and the value is rarely, if never, used, this is a strong indication that the format is likely wrong.

Some fields of a DCI correspond to table entries given in the configuration parameters. If a field is given such that it does not correspond to any known entry, this may also be an indication that the format is wrong.

For Uplink DCI in 5G, the UL-SCH indicator bit should be high for most DCI messages. The only time it is not high is when the RNTI is a SP-CSI-RNTI (see TS 38.212). If SP-CSI-RNTI is never configured, then the UL-SCH indicator bit must always be high.

Determining where a Format Error May have Occurred

If it is believed to be a valid C-RNTI and DCI length but the format is wrong, one may rely on the observation of which fields appear to be wrong. Many fields can be independently verified for correctness. For example, if one is successful at decoding the appropriate uplink or downlink shared channel message, then it may be ascertained that the corresponding frequency and time allocation fields of the DCI are correct. Another example is if the corresponding acknowledgement on a PUCCH is successfully decoded.

Using the known good fields as well as the observation of the set of values that other fields may take on, one can hypothesize where there may either be missing and/or added bits. For example, if the time allocation is correct but the downlink assignment index appears to be wrong, then one may try adding or subtracting bits in between these two fields to see if this would cause the incorrect fields to take on expected values. This may need to be done multiple times, but in practice, this is generally not necessary.

If most of the fields are either correct by validation of other means or by small modifications to the configuration between the UE and network, then we treat the DCI as being successfully decoded and update the appropriate entry in the C-RNTI table.

Other content that may be observed:

Using the RRCSetup messages, one can monitor for various sounding signals sent on the downlink and uplink including CSI-RS (channel sounding information reference signal), SRS (sounding reference signal), CSI-IM (channel sounding information interference monitoring), and others.

The physical uplink and downlink shared channels may be decoded using the parameters from the C-RNTI Table as well as the corresponding DCI messages.

Control elements that are sent as part of a PDSCH or PUSCH message may also be observed as they are sent without encryption. Examples of control elements include asynchronous triggers of sounding signals and UE buffer status reports.

Descrambling Pilot Tones

Assume:

The pilot tone sequence is generated from a scrambling ID (i.e., a seed value). The set of possible phases for a given pilot tone is P. The set of possible magnitudes for a given pilot tone is M. In practice, the size of P is 4, and the size of M is 1.

Received adjacent pilot tones' phase error within a given OFDM (Orthogonal frequency-division multiplexing) symbol are within some small deviation. This assumption is reasonable due to the fact that a large phase error would imply a large carrier frequency offset and various other parts of the radio would have started to fail before this.

Received adjacent pilot tones' magnitude error within a given OFDM symbol are within some small deviation.

Tree Initialization

For every possible scrambling ID, generate a sufficiently long sequence such that each sequence is unique and add it to a prefix tree where the hamming distance of each scrambling ID is reported (up to some distance). Each edge in the tree corresponds to one value in the sequence.

An example of an Algorithm includes:

```
1.   Organize all of the pilot tones as a vector V.
2.   (p0,m0) := (0,0)
3.   seq := empty sequence.
4.   For each pilot tone t in V:
     a.   (pD,mD) := (infinity,infinity)
     b.   (pN,mN) := (0,0)
     c.   (p0',m0') := (0,0)
     d.   For each (p,m) in PxM:
          i.     pI := phase error of p and t
          ii.    mI := magnitude error of m and t
          iii.   If the difference of phase error of pI and p0 < pD:
                 1.   pD := difference of phase error of pI and p0
                 2.   pN := p
                 3.   p0' := pI
          iv.    If the difference of magnitude error of mI and m0 < mD:
                 1.   mD := difference of magnitude error of mI and m0
                 2.   mN := m
                 3.   m0' := mI
     e.   Append (pN,mN) to seq.
     f.   (p0,m0) := (p0',m0').
```

-continued

---

5. Lookup seq in the prefix tree described above.
  a. If there is no corresponding matching subsequence of sufficient length and
not all possible phase offsets have been searched, increment each phase offset and repeat step 6.
  b. If there is no corresponding sequence and all possible phase offsets have
been searched, find the maximum subsequence in the tree that does match for every possible phase
and return the scrambling IDs of the leaf nodes ordered by hamming distance.
  c. If there is a matching sequence, return a list of scrambling IDs ordered by the
hamming distance.

---

Additional Notes

Hamming distance can be used in the algorithm above, but any noise tolerant matching algorithm may be used, such as maximum likelihood.

In a noiseless environment, Hamming distance is not necessary, and instead the algorithm may be implemented by keeping at each node of the prefix tree the set of scrambling IDs it corresponds to.

The algorithm is linear in the length of sequence times the number of possible phases and number of possible magnitudes (i.e., $O(IMIIPIIVI)$). A naive (brute force) algorithm would be proportional to the number of scrambling IDs multiplied by the length of the sequence (i.e., let the set of scrambling IDs be S, then $O(ISIIVI)$).

In practice, the algorithm is several orders of magnitude faster than a brute force algorithm that tries every possible scrambling ID due to ISI>>IMIIPI. For example, in most of 5G, ISI is equal to $2^16$, IMI is equal to 1, and IPI is equal to 4. The algorithm presented is asymptotically $2^14$ faster than a brute force algorithm under 5G assumptions.

This algorithm can be applied for any pilot tone sequence that is generated from a seed value including (but not limited to) messages on PDCCH, PDSCH, PUCCH, and PUSCH.

The list of scrambling IDs should be tried in order when needed by later stages of decoding such as the descrambler for UE-specific search space DCI messages.

This algorithm may also be used in the presence of multiple scrambling IDs. In this case, one treats the set of scrambling IDs as being a composite of the different possible scrambling IDs (i.e., the cross product of all the individual scrambling ID sets). This might be used in some configurations of 5G (e.g., two scrambling ids for PDSCH). If the configuration is not known, one may need to try both using one as well as two scrambling IDs. The resulting speed up for two joint scrambling IDs in 5G would be asymptotically $2^30$.

The algorithm may be further modified by keeping a moving average of pilot tone error while iterating instead of just keeping track of only the previous pilot tone error. This has the advantage of being able to average out any noise present. This process may also be applied after the iteration and before the lookup by keeping track of the phase errors in a separate sequence.

Synchronization of Uplink Signals

Uplink messages are time aligned with the base station. If a piece of test equipment is placed at a location other than the base station, the signals are no longer properly time aligned at the measurement location and must be individually synchronized with the test equipment.

According to one embodiment, a procedure may include

1) Decoding uplink messages from multiple client devices (UEs) based on measured timing of those signals—In which a different timing offset is found for each UE 2) Finding the timing for a given UE by observing messaging on the physical random access channel By observing Msg1 (PRACH preamble) which is transmitted from the UE to the base station on the physical access channel By observing any of the following messages, Msg3 (RRCSetupRequest) or Msg5 (RRCSetupComplete), which are exchanged between the UE and the gNB 3) Finding the timing for a given UE by observing resynchronization messages subsequent to the initial synchronization of the client Using the PRACH which may occur if re-synchronization is required In which the test system transmits a message that induces re-synchronization of a UE, so that the PRACH associated with the resynchronization can be observed by the test system.

4) Finding the timing for a given UE by observing signals during the normal operation of the UE Using any signal sent by the UE that has an identifiable pattern that shows the timing of the signal In which the identifiable pattern is a Zadoff-Chu sequence In which the identifiable pattern is due to the message having low information density, or a consistent set of information Using the Sounding Reference Signal (SRS) that is present in FDD (Frequency-Division Duplex) systems Using the uplink control information messages Using the Demodulation-Reference Signal (DM-RS) which is present on the physical uplink shared channel Using acknowledgements or scheduling requests to downlink traffic that is sent from the UE to the base station. These have common formats (PUCCH format 0 and 1), They contain little varying information (have low information density) and have Zadoff-Chu patterns within them.

Using the Demodulation-Reference Signal (DM-RS) which is present on the physical uplink control channel 5) When the timing of a particular signal is found, using that timing to facilitate decoding by the following steps Once the timing difference between what is received from the base station and what is received from a given UE is found, the signal received on the uplink is realigned so as to match the base station for a given UE. Depending on how large the offset is, this realignment may need to occur independently for each UE, or a single realignment may apply to multiple UEs. The information from the downlink control information messages, which schedule a particular UE on the uplink, is used to extract the appropriate messages, if present.

Sub-Band Sampling

This section provides details regarding sub-band sampling that might be necessary in the case when the SDR has insufficient sampling bandwidth. Assumptions:

1. The SDR does not have a sufficient sample rate in order to be able to capture. For instance, in some bands, this is about 5 Msps, for others, this is about 10 Msps.
2. The SDR has low phase noise and has an accurate RF tuner with a relative error with itself of <1% of the carrier frequency for 5-10 MHz.
3. The channel is either slow fading or relatively predictable. If this assumption is false, it may still be possible to recover information, but not very reliably.

Given these assumptions, there are several periodic signals that are either defined by the standard or in practical implementations remain relatively unchanged. These three relatively periodic signals are:

1. The Synchronization block (SSB). The SSB contains the Physical cell id, beamforming index, and Master Information Block (MIB), all of which have stable and consistent values.
2. The System Information Downlink Control Information (DCI). The DCI contains the Location in time/frequency of the System Information Block 1 (SIB1), and how the SIB1 is encoded. These fields are stable and consistent over time.
3. The System Information Block 1 (SIB1). SIB1 contains various things needed to initially configure communication including PLMN, PDCCH, PDSCH, etc. These fields are also stable and consistent across time.
4. SIB2 and higher also contain consistent information and are therefore repetitive. However, these are transmitted less often than SIB1.

In practice the System Info DCI generally has two possible messages instead of one, but it is still periodic. By correlating to either of the two messages, perhaps in the same pattern as they are appearing, this field can be used to determine the time alignment of the separate captures. The SSB does change the System Frame Number information. However, this signal is periodic as well albeit with a longer period of 1024 system frames.

Given all of the above, it is possible to take fractional parts of the bandwidth (the maximum that the SDR allows) over time and essentially put these pieces back together in the processing because, with the exception of the channel and some small variances in the System Info DCI and SSB, they are time invariant.

One embodiment of a procedure may include:

1) Detection and analysis that a cellular signal is present, working from sequential measurements of different spectral subparts of the cellular transmission
   For identifying that cellular interference is present
   For extracting information from the cellular headers
2) Use of repetitive (periodic) portions of the signal to enable decoding with spectral subparts
   Alignment in time and frequency of repetitive portions of the signal
   Repetitive portions of the signal including the Synchronization Block (SSB), particularly the Physical cell ID, Beamforming index, Master Information Block (MIB)
   Repetitive portions of the signal including the System Information Downlink Control Information (DCI), particularly the Location in time/frequency of the System Information Block 1 (SIB1), and how the SIB1 is encoded.

Repetitive portions of the signal including the System Information Block 1 (SIB1), particularly various things needed to initially configure communication including PLMN, PDCCH, PDSCH, and etc.
   SIB2 and above, which also contain consistent information, but are sent less frequently than SIB1
3) Use of semi-periodic portions of the signal, which may have a finite set of values
   Use of the DCI when it contains two possible messages, each transmitted repetitively
4) Combining of different captures using any of the following steps 4)
   Detection of repetitive portion of the signal is accomplished using auto-correlation (self-correlation) or cross correlation with a known pattern
   Alignment of the repetitive portions of the signal in time
   Frequency shifting (mixing) and combining of the some or all of the captures to correctly align the frequency relationships of the captures
   Decoding of the composite signal achieved by combining the time aligned and frequency shifted independent captures
   In which phase noise/phase shifts are tracked and corrected independently for each frequency segment
   In which decoding is done iteratively, trying multiple possibilities for the timing alignment, particularly when the detection of the repetitive portion of the signal is inaccurate 5G Tool The following description may involve a 5G tool configured for 5G measurement and analysis according to various embodiments.

A key capability of this tool is to drill down from over-the-air protocol messages to the raw I/Q samples. This allows us to characterize, in detail, channel conditions, including interference, with the aim of estimating maximum achievable channel capacity and diagnosing subtle system impairments. The user is provided with ready access to all data captured in all locations and is provided with visualizations and custom post processing. The system can be applied to multi-user MIMO deployments at all occupied carrier frequencies, including C-band, and for both FDD and TDD (Time-Division Duplex) deployments.

The tool can capture detailed information without a SIM card and without connecting to network, allowing observation of neighbor networks and other service providers. Furthermore, the tool is software upgradeable to easily support new features and functions.

Prototype System Results

We have used this system and its capabilities to analyze 5G signals in San Francisco, near the Golden Gate Park. It has already yielded some interesting results, as described below.

Figure 7:
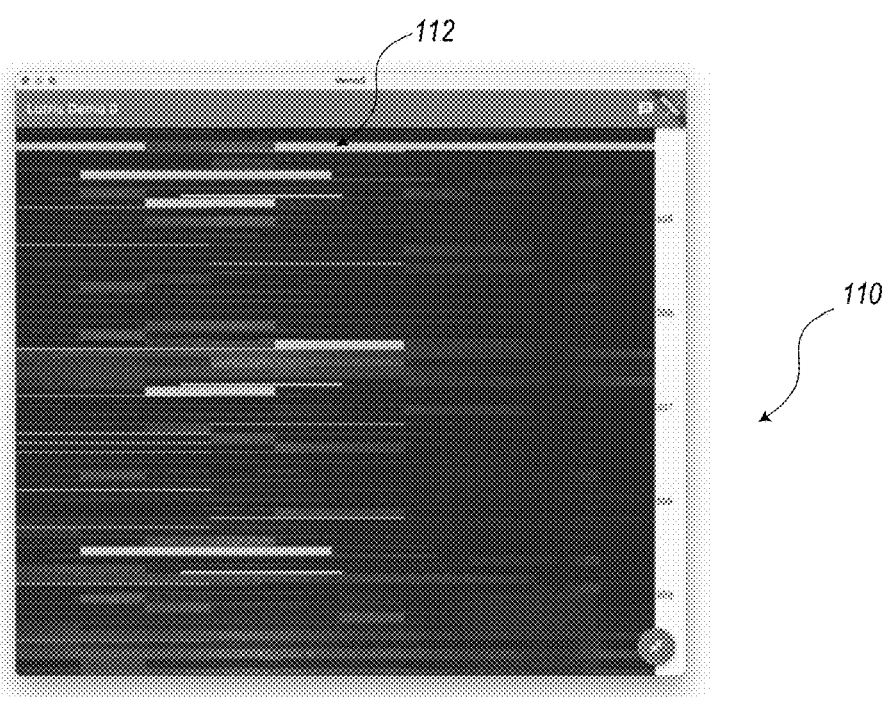
FIG. 7 is a screenshot showing an example of a 5G NR inspection test.

FIG. 7 is a screenshot 110 showing an example of a 5G NR inspection test. The screenshot 110 shows a view of a user display from the 5G tool demonstrating a spectrograph with frequency on the horizontal axis and time advancing on the vertical axis. Highlighted sections are the messages that have been successfully decoded.

Figure 8:
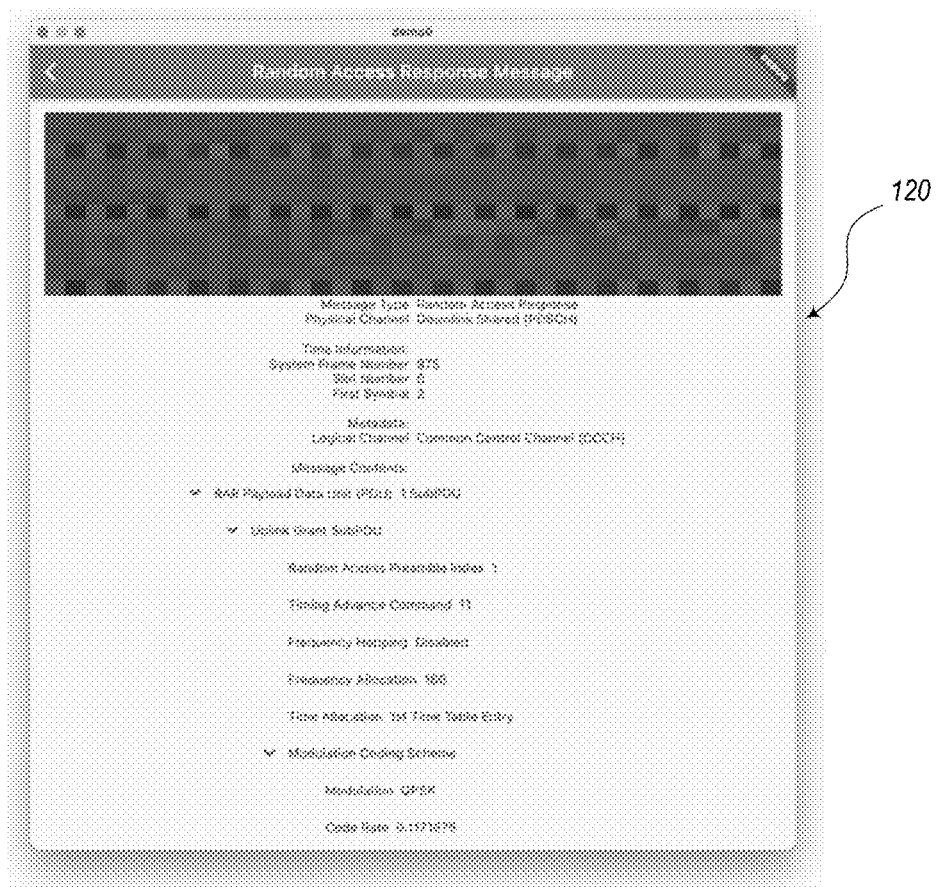
FIG. 8 is a screenshot showing an example of a Random Access Response (RAR) message of a 5G NR inspection test.

FIG. 8 is a screenshot 120 showing an example of a Random Access Response (RAR) message of a 5G NR inspection test. The screenshot 120 is from the 5G tool and demonstrates a random access response message that was successfully decoded. The top figure is the message where the horizontal axis are the subcarriers, and the vertical axis are the OFDM symbols.

Figure 9:
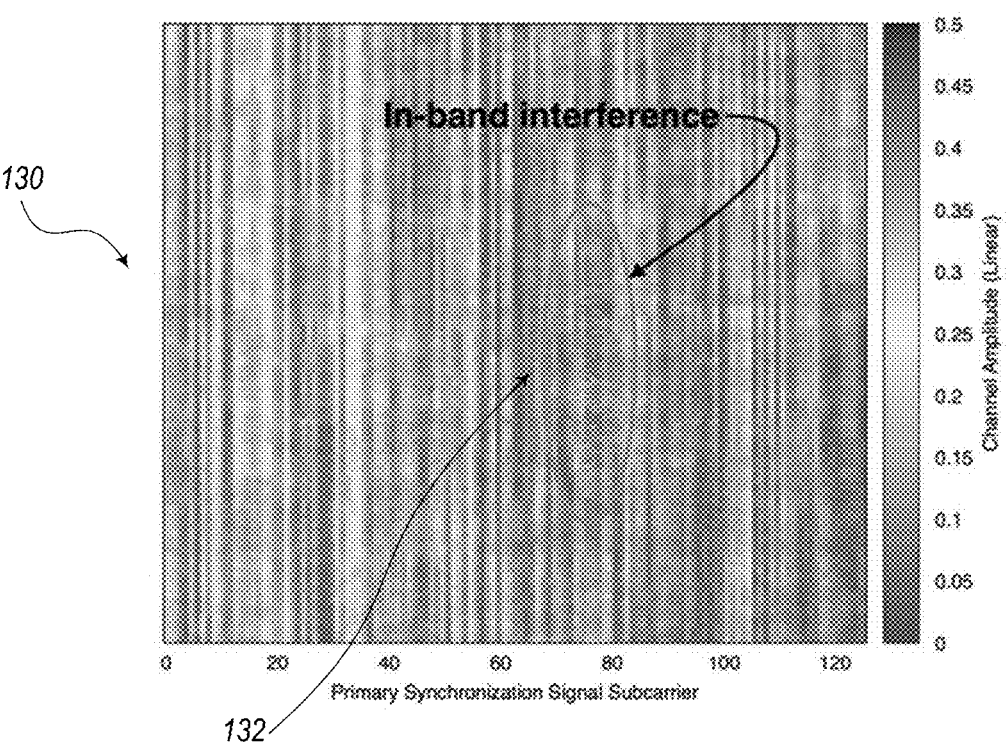
FIG. 9 is a graph showing an example of test results of a wireless signal analysis test.

FIG. 9 is a graph 130 showing an example of test results of a wireless signal analysis test. The graph 130 shows the detection of the Primary Synchronization Signal (PSS) over a period of several hours. The color scale indicates the magnitude of the measured complex signal. In the plot, the area circled 132 shows high-rate fluctuations in time, indicating in-band interference. (It is possible, though unlikely, that this effect is due to some very repeatable type of frequency-selective fading.) The graph 130 shows the Physical Synchronization Signal magnitude and shows detection of in-band interference.

Figure 10:
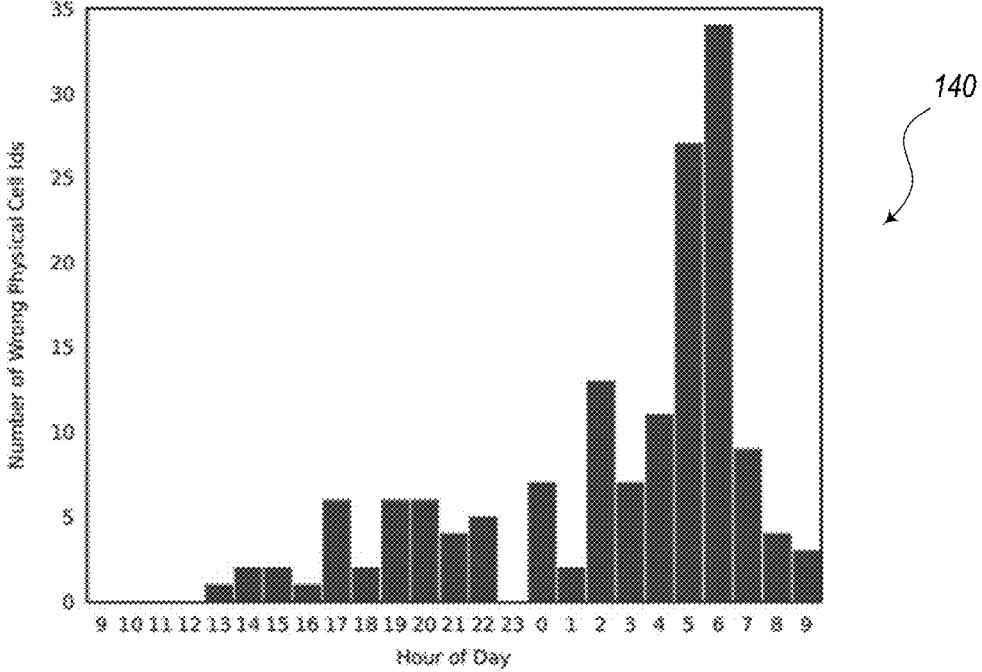
FIGS. 10-12 are bar graphs showing examples of test results of a wireless signal analysis test.
Figure 11:
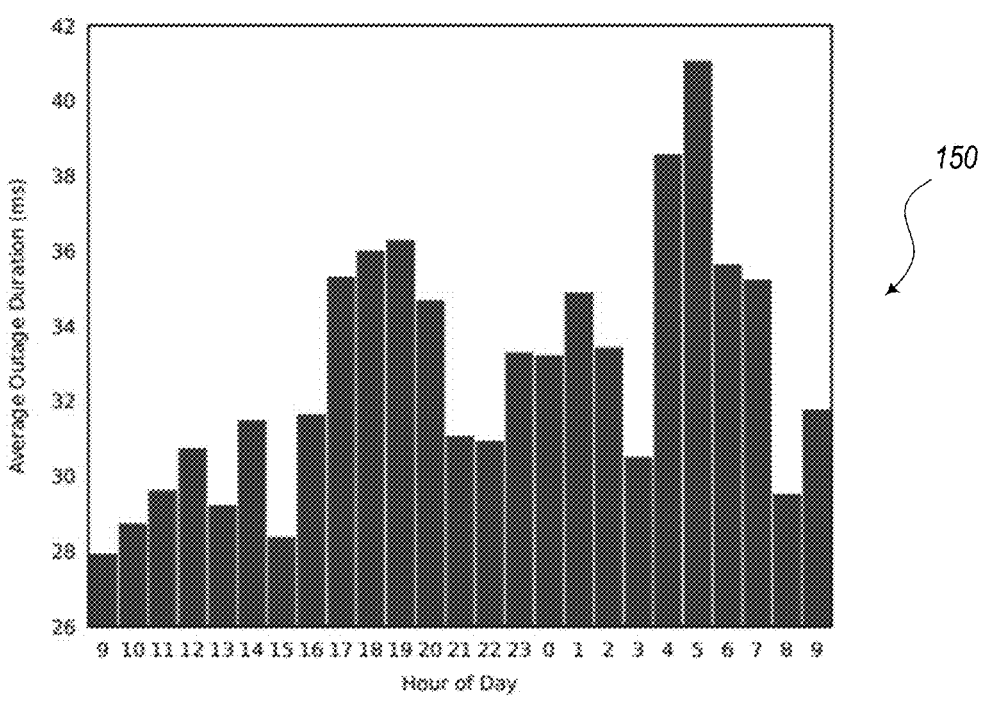
Figure 12:
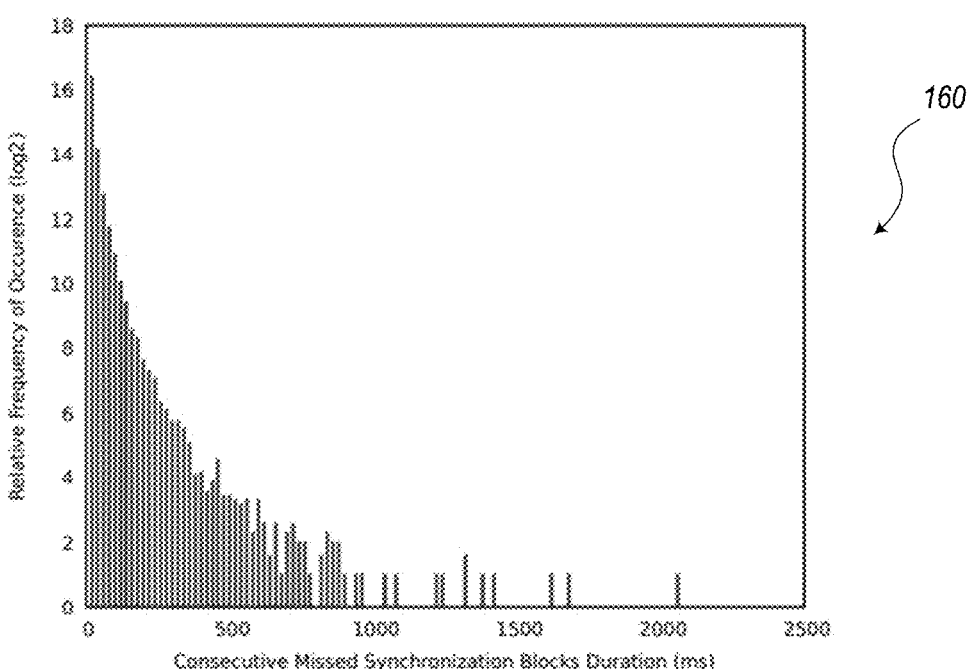

FIGS. 10-12 are bar graphs 140, 150, 160, respectively, showing examples of test results of a wireless signal analysis test. The graphs 140, 150 show interesting aspects of the radio channel in San Francisco.

The graph 140 is a plot of how many times per hour a Primary Cell ID is successfully decoded that is not the same as that of the closest cell. This essentially detects when propagation conditions are favorable for connecting not to the nearest cell, but to the next nearest. The data is plotted over the course of a full day. The peak in the early morning hours is not a surprise—the temperature inversion effect that causes the well-known "marine layer" in San Francisco is strongest just before sunrise.

The graph 150 plots the longest runs of repeated failures to decode the System Synchronization Block. It shares the same early morning peak, again, expected because that is when ducting is creating inter-cell interference. The secondary peak in the late afternoon to early evening is not yet understood and is being studied.

The graph 160 shows a histogram of the how many SSBs pass before one is decoded successfully. We see that most of the intervals between successive successful decodes are short, but there is a tail which may affect overall system capacity.

Again, the 5G tool captures 5G signals with commercially available Software Defined Radios and utilizes SW demodulation and decoding on standard servers to analyze the behavior and performance of 5G networks. This tool is uniquely suited to aid in the deployment and monitoring of 5G systems, helping to drive 5G deployment into private networks as well as service provider operated networks.

From FIG. 10, the number of correctly decoded cell IDs that do not refer to the nearest cell are shown. To get a sense of the scale, the PCI of the nearest cell has been detected tens of thousands of times. The peak wrong PCIs near sunrise may be associated with a temperature inversion and atmospheric ducting of the radio signal.

From FIG. 11, the graph 150 of repeated failures to decode the System Synchronization Block (SSB) versus time of day is shown. The vertical axis is the time between successive correct decodings of the SSB.

From FIG. 12, the histogram of repeated failure to decode the System Synchronization Block (SSB) is shown. The horizontal axis is the temporal gap between successive successful decodes; the vertical axis is how many times such a gap occurs during the data collection period of 24 hours.

5G Snooper

According to some embodiments, technology of a 5G snooper may include software radios, which are best suited for applications where at least one of these hold:

a) Low volume—Cannot amortize the initial cost of making a chip b) Flexibility is more important than other metrics (e.g., energy efficiency form factor, etc.). Need to change post-shipping due to either complexity (bug fixes inevitable) or changing requirements.

c) Development time needs to be minimized

Abstract Overview Mockup

Figure 13:
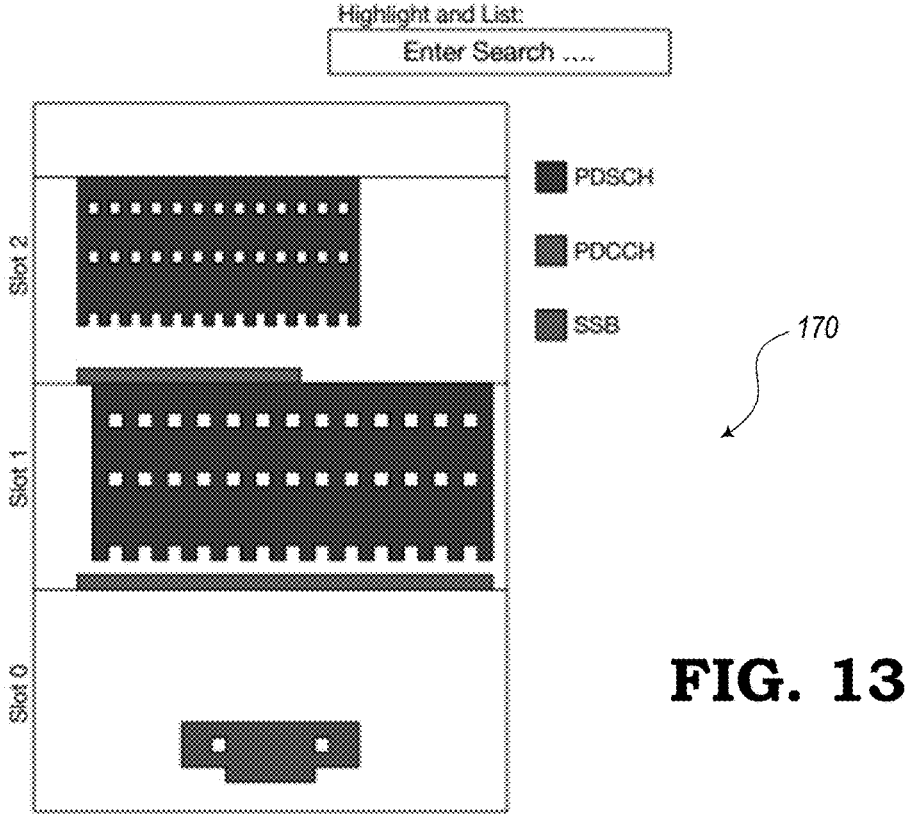
FIG. 13 is a diagram illustrating an abstract overview mockup of a wireless transmission inspection system.
Figure 13:
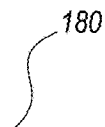

FIG. 13 is a diagram illustrating an abstract overview mockup 170 of a wireless transmission inspection system according to various embodiments. The abstract overview mockup 170 shows successfully decoded message locations in time and frequency and can show failed decoded shared channel messages. This can be presented in a UI with an ability to click on a message and open a detailed view, an ability to search and display (1) types of messages (e.g., SSB, Random Access Response, etc.) and (2) flow of individual UE messages (e.g., technically the same TC-RNTI/C-RNTI), and the like.

Spectrograph View Mockup

Figure 14:
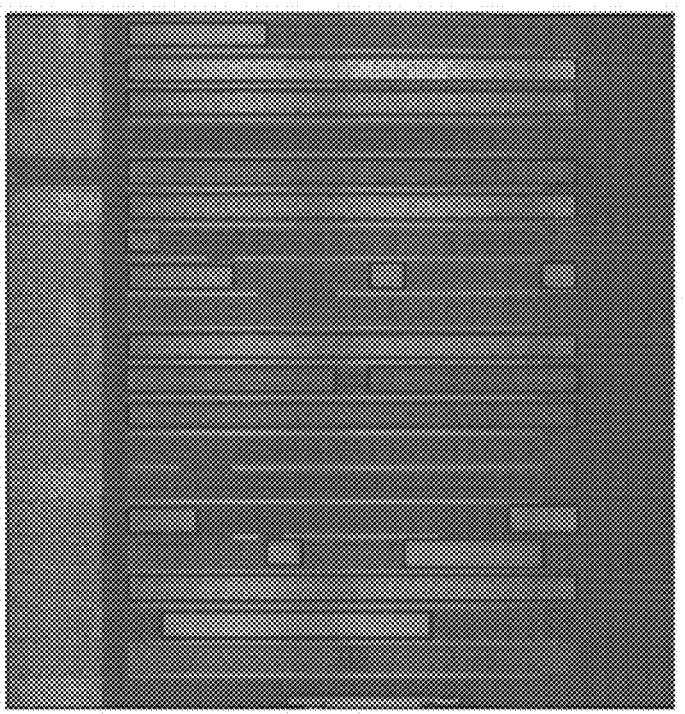
FIG. 14 is a screenshot showing an example of a spectrograph mockup.

FIG. 14 is a screenshot 180 showing an example of a spectrograph mockup. The screenshot 180 is similar to a spectrometer and is intended for observing changing channel conditions and possible interference. The spectrogram can be annotated (or not) with an ability to see guard bands and out of band transmission (if present).

Figure 15:
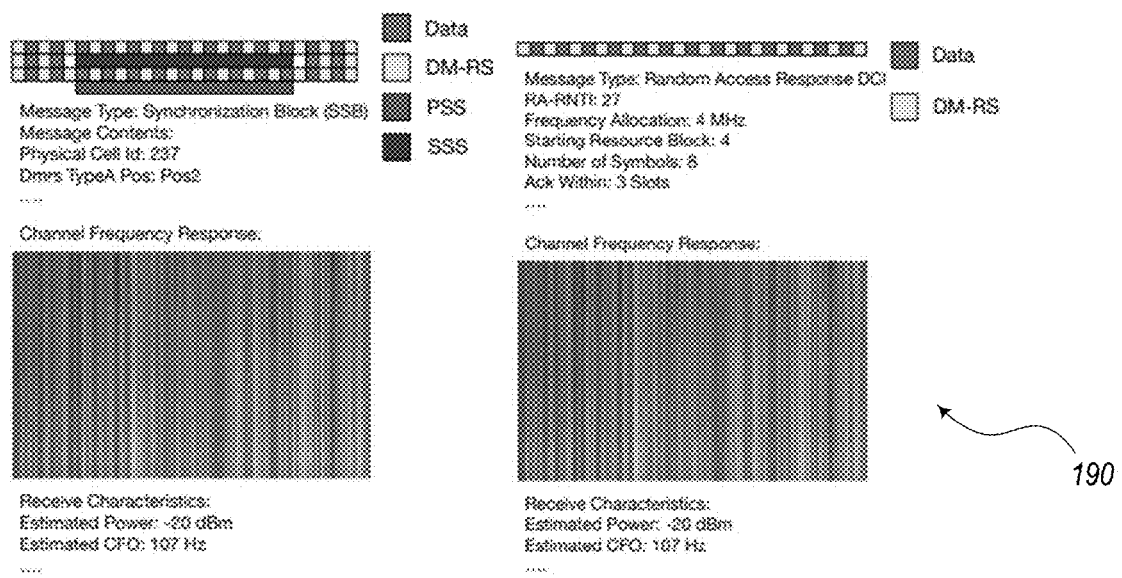
FIG. 15 is a diagram illustrating a Synchronization Signal Block (SSB) RAR system and channel frequency responses.

FIG. 15 is a diagram illustrating a Synchronization Signal Block (SSB) RAR system 190 and channel frequency responses, according to various embodiments.

Figure 16:
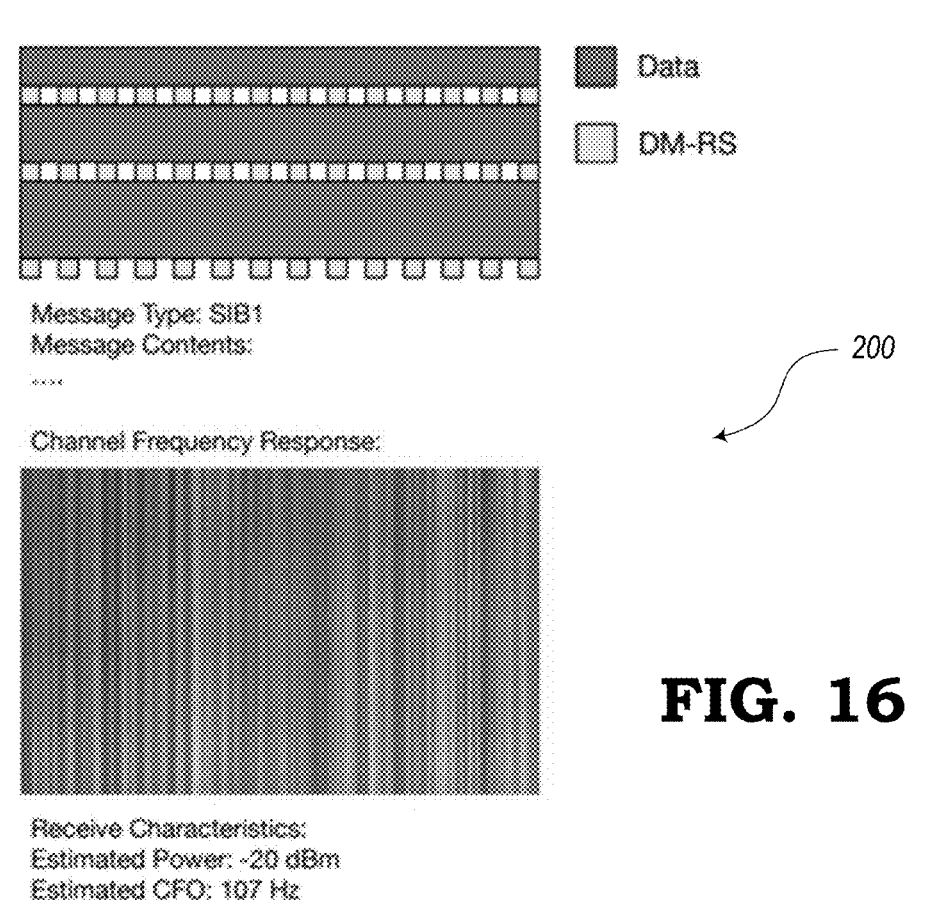
FIG. 16 is a diagram illustrating a System Information Block 1 (SIB1) system and channel frequency responses.

FIG. 16 is a diagram illustrating a System Information Block 1 (SIB1) system 200 and channel frequency responses, according to various embodiments.

Additional Signals for Decoding

The following are some additional signals that can be decoded

Downlink sounding reference signals (CSI-RS)—periodic, non-periodic, and channel matrix.

Basic Uplink Messages—TDD and capture close to base station and FDD or capture far from base station Uplink sounding reference signal (SRS)

Dedicated UE control messages—ability to highlight all signals, monitor transmission/retransmission of packets Dedicated UE shared messages Real time capture, process, and display Active association with base station Carrier aggregation Unlicensed bands/advanced CBRS LTE/NSA support 5G Apps In an embodiment, 5G Apps can be provided such as for consumers trying to determine the best service provider, hobbyists wanting to decode signals, and service provider debugging/improving their network.

For determining the best service provider, Metrics of the best service provider:

Coverage: Do I have coverage everywhere that I care about?

indoors and private spaces included

Throughput: If there is coverage, what can I expect to get?

The current approach for determining the best service provider is to (1) use ISP coverage maps which are very coarse, inaccurate, and/or do not provide actual throughput numbers, (2) use speed test maps by 3rd parties which has limited measurement in non-urban spaces and is unable to say anything about private and indoor environments, (3) buying multiple SIM cards and trying them all out which is costly both in time as well as in money, and (4) word of mouth. That is, there is really no way to determine which service provider is best for me, individually, in my home, at my office, in the areas I travel, etc. The approach described herein provides an effective way to measure these details without the deficiencies described above.

A Best Service Provider App. Can determine the best service provider for an individual's needs. With the approach described herein, metrics can be determined for multiple service providers simultaneously without SIM cards.

Features:

Coverage: Which providers are available?

Signal strength

Lower bound estimate on data throughput

Figure 17:
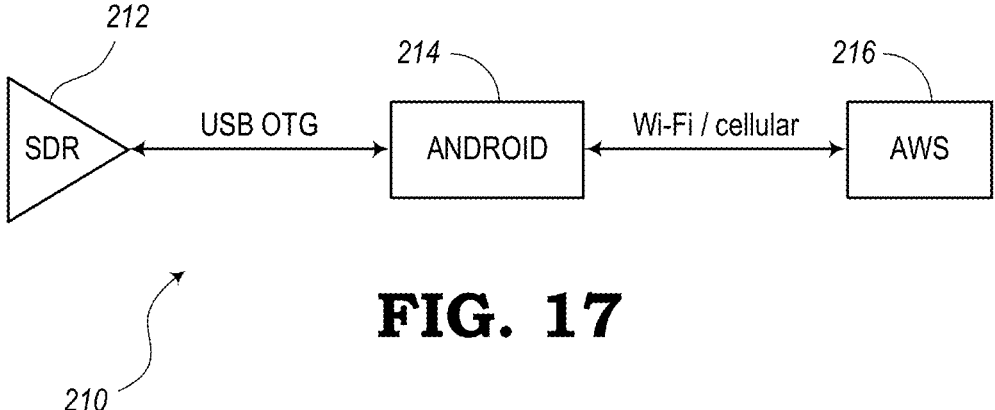
FIG. 17 is a block diagram illustrating an initial approach for developing a wireless transmission inspection system.
Figure 18:
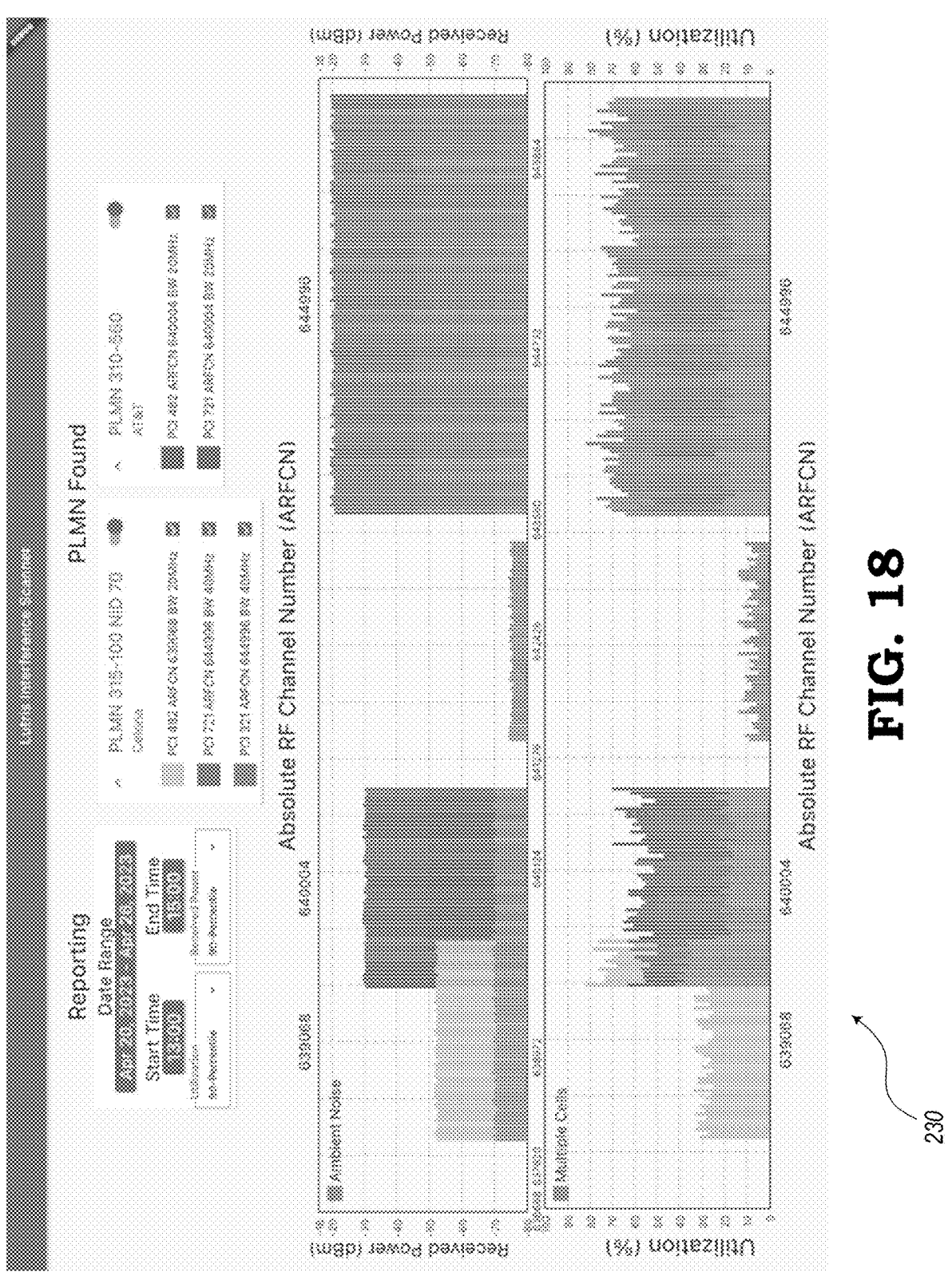
FIG. 18 is a screenshot showing an example of test results for an interference scanner.

FIG. 17 is a block diagram illustrating an embodiment of a wireless transmission inspection system 210. As shown, the wireless transmission inspection system 210 includes an SDR 212 configured to capture OTA signals and provide Universal Serial Bus (USB) On-the-Go (OTG) data to an Android device 214 or other suitable computing system having wireless communication capabilities. The Android device 214 provides Wi-Fi and/or cellular data to an Amazon Web Service (AWS) 216 or other SP. Of course, Android is one implementation, other can include Apple (iOS), Windows, Linux, etc.

Android app directs the SDR to collect N I/Q samples for a specific frequency

SDR returns I/Q samples to Android

Android determines if synchronization block is present. If present, report signal strength to user and send samples to AWS (or any cloud)

Repeat for every possible channel

AWS returns the results of processing

Drive Test Experiment

According to some embodiments, Drive Tests may include the following features to evaluate the performance and characteristics of a deployment:

Throughput (Mbps)

Channel rank (e.g., 1, 2, . . . )

Signal strength (dBm)

Channel quality (MCS)

Framework—Drive around a location, and, in parallel, run a software defined radio and a handset and determine the correlation, collect the downlink channel sound information (CSI-RS). focus is on single user MIMO.

SDR Solution measures everything that the drive test does. In addition: channel matrix including eigenvalues, direction finding, etc.

In an example embodiment, the SDR hardware includes a Universal Software Radio Peripheral (USRP) capable of 100 MHz with four receive chains, C-band max bandwidth is 100 MHZ, CBRS band max bandwidth is 100 MHz but not guaranteed to be contiguous. Therefore, need a second USRP to get the entire bandwidth of 150 MHz. For FDD bands will also need and additional USRP—4 element antenna array ideally something similar to a handset.

Details on Decoding

A search space: defines the schedule, possible logical location of messages, and what types of control messages may be sent—a search space being scheduled does not guarantee presence only possibility. There are two types of search spaces: common and UE-specific. Control resource sets (CORESET): define physical resources associated with one or more search spaces How Downlink Control Messages are Normally Decoded Assume to have:

A UE is given the configuration of all relevant search spaces and coresets

A UE may be given a scrambling ID that is used to orthogonalize the pilot tones from other search spaces A UE has a list of RNTIs (IDs that it may use to decode) that are relevant to it For each type of message, the length and format of the message For each slot:

A UE determines which search spaces may be present

Using the RNTIs that it has available, it searches the relevant coreset

The RNTI can cause the location of the message to move

For each possible aggregation of subsets of the coreset, the UE attempts to channel equalize using the scrambling ID Message is descrambled using the RNTI and scrambling ID Polar decoding is then done expecting a specific RNTI to be used as the CRC. The message length must be known at this point If CRC passes, then the message's individual fields are decoded UE Decoding Complexity For a given search space, the message search and decode complexity is determined by:

P: Total permutations of locations within the coreset (typically 20)

R: Number of RNTIs within a search space (typically 3)

N: Total number of subcarriers (typically 300-400 I/Q symbols)

Polar: Time of the polar decoder as a function of the number of bits

There are contributors but the above represents 98% of the runtime/space complexity. To fully check a search space of a given UE requires:

$$O(P * R * \text{Polar } (N))$$

Almost Zero Knowledge Decode—Decoding with zero knowledge is not practical. (Anything could be a control message.)

Accordingly, we assume

Base search space configurations are given from the SIB1 and eavesdropped RRCSetup messages Any new search spaces that are not known are based on these principles In practice:

Search spaces always appear in the first or the first and second OFDM symbol of a slot For example, AT&T system uses one OFDM symbol. T-Mobile uses two OFDM symbols.

Determining Active RNTIs:

Discovery without brute force:

Using the SIB1, we can back calculate the space of random access RNTIs (RA-RNTIs) (typically 1-3)

With access to the RA-RNTI messages, we also get access to the Random Access Response messages which yields the Temporary Cell RNTI (TC-RNTI)

Listening to the TC-RNTI messages, we can then determine if the RNTI is actually used. If so, we can promote it a Cell RNTI (C-RNTI), which is used for normal messages Worst-case brute force:

Slightly less than $2^{16}$ possible RNTIs

Necessary for many special RNTIs that may only be configured while security is enabled Determining Scrambling ID: Scrambling ID is used to scramble the pilot tones Use the phase error from the CFO to determine the sequence of the pilot tones The phase error between two adjacent or nearby pilot tones in frequency within the same OFDM symbol should be within some delta With a sufficiently long sequence, there will be one and only one possible scrambling ID that corresponds to that sequence Hamming distance may be needed to the presence of noise, which will ultimately determine how long a sequence is necessary The time to calculate the scrambling ID is linear. The space necessary is proportional to the number of possible patterns ($2^{16}$)

Determining Message Length and Format

Start with a message length and format based on what was discovered from RRCSetup Vary the message length from there and check for messages To determine format, compare the message fields to what is sent on the physical shared channels as well as the uplink This method is error prone.

Message lengths vary due to things such as some UEs using carrier aggregation and not others as well as different capabilities of the UE Even if some fields look okay, parts of the message may still be interpreted incorrectly even if the length is right Repetition and patterns in the messages will need to be used to validate the results Acquiring Control Information The procedure here below describes how to acquire control information available in the downlink without having associated with the network.

Downlink control acquisition involves a series of steps, which may include:

0. Acquire the System Information Block 1 through normal means.

1. Exhaustively search all possible RNTI (Radio network temporary information) when PDCCH (Physical downlink control channel) is present, looking for a successful CRC check.

2. Extract all Control Elements from the MAC PDU (payload data unit).

3. If the message is on the DCCH (Dedicated control channel), sent via SRB1 (Signal radio bearer 1), the message is an RRCSetup, and the message is not encrypted, then acquire the cell group config.

4. Use the information from RRCSetup to monitor PDCCH in other downlink bandwidth parts as indicated in steps 1 and 2.

Channel state information (CSI-RS) may then be acquired using as indicated by the RRCSetup message. This approach acquires the initial configuration used for a UE that associates. In order to generalize to UEs where the RRCSetup message is not observed, one must assume that configuration is shared among UEs. Also, one must assume that the configuration does not change more slowly than the number of RRCSetup messages transmitted.

Monitoring Downlink Control Information

Of particular interest is in monitoring downlink control information because . . . . A traditional way would be to associate with the network—again, we do not want to do that. Accordingly, we provide an alternative approach:

For 1, calculate the expected work in the exhaustive search.

"Channel state information (CSI-RS) may then be acquired using as indicated by the RRCSetup message."—as indicated where?

Localization using both received signal strength and identifier.

Typical approaches of wireless localization without explicit signaling use signal strength and a form of triangulation in order to determine the location of a transmitter. In practice, this can prove to be very difficult in the presence of multiple radio transmitters, making it difficult to disambiguate the signals.

An alternative approach would be to use the already present transmitted signals within a device that are sent. For 802.11, this would be the MAC address. For 3GPP (e.g., LTE or 5G), this would be the RNTI. A tuple of SNR and identifier can then be used to uniquely localize multiple devices simultaneously.

The principal approach would be to have an always-on receiver that decodes all messages independent of the identifier. This is contrast to most specifications that explicitly attempt to avoid decoding messages where the receiver is not the intended target. In 802.11, a message is discarded if the destination MAC address does not match. In 3GPP, each UE has a specific time slots and is designed only to listen on the downlink of base stations (e.g., eNB or gNB).

Before any uplink synchronization may happen, we must assume that the snooper has downlink synchronization and acquired SIB1 (System Information Block 1).

Most UE synchronization is done via the physical random access channel in what is called Message 1 (Msg1) which is a Zadoff-Chu sequence that is specified to be sufficiently long and can be used to work at sufficiently long distances. The gNB then sends feedback to have it fit within its timing (Msg2). There are then a few more exchanges Msg3, Msg4, and Msg5 that ensure everyone is on the same page.

As a 3rd party, if you happen to eavesdrop on this, then you can acquire the synchronization information and also be able to demodulate the uplink channel for that receiver.

What if you happen to start eavesdropping and miss the synchronization? The simplest solution would be to wait until the PRACH is used again, which might happen for a few different reasons (lost synchronization, beamforming recovery, and a few others). However, the use of the PRACH is not guaranteed. Therefore, an alternative approach is necessary in the worst case.

In order to be able to synchronize, we require a known low information density signal to synchronize against. Fortunately, there are a few that happen as part of normal operation in the uplink. In FDD, there is the sounding reference signal (SRS). In both TDD and FDD, there are the uplink control information messages, most of which are either for scheduling requests or acknowledging messages received on the downlink. In addition, there is the demodulation-reference signal (DM-RS) on the physical uplink shared channel.

In practice, the most frequent signal will be the acknowledgements. As most UEs (e.g., handsets) will be mostly receiving on the downlink rather than transmitting on the uplink, then it makes sense to use that as the primary synchronization signal. The common formats for this are PUCCH format 0 and 1 both of which are generated Zadoff-Chu sequences and may be used for synchronization, assuming that the doppler shift and distance is sufficiently low.

Some assumptions:

1. The SDR does not have a sufficient sample rate in order to be able to capture. For some bands, this is about 5 Msps. For others, this is about 10 Msps.
2. The SDR has low phase noise and has an accurate RF tuner with a relative error with itself of <1% of the carrier frequency for 5-10 MHz.
3. Channel is either slow fading or relatively predictable. If this assumption is false, it may still be possible to recover information, but not very reliably.

Given this, there are several periodic signals that from either the standard or through experience through measurements remain relatively unchanged. These three relatively periodic signals are:

1. Synchronization block (SSB): Physical cell id, beam-forming index, and Master Information Block (MIB)
2. System Information Downlink Control Information (DCI): Location in time/frequency of the System Information Block 1 (SIB1), and how the SIB1 is encoded.
3. System Information Block 1 (SIB1): Various things needed to initially configure communication including PLMN, PDCCH, PDSCH, etc.

It has been seen that the System Info DCI generally has two possible messages instead of one, but it is still periodic.

Given all of the above, it is possible to take fractional parts of the bandwidth (the maximum that the SDR allows) over time and essentially put these pieces back together in the processing because, with the exception of the channel and some small variances in the System Info DCI, they are time invariant.

Before any uplink synchronization may happen, we must assume that the snooper has downlink synchronization and acquired SIB1 (System Information Block 1).

Most UE synchronization is done via the physical random access channel in what is called Message 1 (Msg1) which is a Zadoff-Chu sequence that is specified to be sufficiently long and can be used to work at sufficiently long distances. The gNB then sends feedback to have it fit within its timing (Msg2). There are then a few more exchanges Msg3, Msg4, and Msg5 that ensure everyone is on the same page.

As a 3rd party eavesdropping on this, if you happen to eavesdrop on this, then you can acquire the synchronization information and also be able to demodulate the uplink channel for that receiver.

In practice, the most frequent signal will be the acknowledgements. As most UEs (e.g., handsets) will be mostly receiving on the downlink rather than transmitting on the uplink, then it makes sense to use that as the primary synchronization signal. The common formats for this are PUCCH format 0 and 1 both of which are generated.

```
BS –> UE:
    Channel:                    PBCH
    MessageType:                SSB + BCH
    BWP:                        Initial BWP
    Functions:
    -       UE Synchronization to Base Station
    -       Master Information Block
            -       Determination of where the SSB is within initial BWP
                    In Frequency:
                    -               Common resource block offset (k_{SSB})
                    -               Subcarrier spacing of BWP
                    In Time:
                    -               System Frame Number
            -       Location of DMRS within a slot
                    -               Second or third position
            -       Determination of PDCCH within Initial BWP (38.213 Tables
                    13-11 to 13-15)
                    -               Where to monitor within a slot
            -       Determination of where to find SIB1 in PDCCH (38.213 Tables 13-1 to
                    13-10)
                    -               CoreSet #0
BS –> UE:
    Channel:                    PDCCH
    MessageType:                SIB1
    BWP:                        Initial BWP
    Functions:
    -       Schedule to find SIBs
    -       Schedule of TDD
    -       Uplink and downlink config
            -       Includes PRACH configuration
UE –> BS:
    Channel:                    PRACH
    MessageType:                Msg1
    BWP:                        Initial BWP
    Function:
    -       Determine initial synchronization for the UE (signal includes
            RA-RNTI)
            RA-RNTI: Encodes the location of the RACH slot
BS –> UE:
    Channel:                    PDCCH
    Message Type:               Msg2
    BWP:                        Initial BWP
```

-continued

```
Function:
-       DCI information sent as to how to read the random access response
Notes:
-       Response is encoded with the RA-RNTI
BS -> UE:
    Channel:                PDSCH
    Message Type:           Msg2
    BWP:                    Initial BWP
    Function:
    -       Uplink grant information
    -       Timing advance for the UE
    Notes:
    -       Need to check that the response corresponds to the random access channel
used
```

Correlation Based Interference Detection in Wireless Systems

Wireless systems have been widely deployed as public networks for many years. Often these systems are deployed in spectrum that has been purchased and is controlled and used exclusively by the network operator. In other cases, the wireless systems operate in unlicensed spectrum that can be used by anyone. Both types of systems often suffer from interference from one wireless system to another, or between devices operating in the same wireless system.

Examples of wireless systems include cellular, often based on the 3GPP 4G or 5G technology, Wi-Fi, Bluetooth, Zigbee. Virtually all wireless systems can suffer interference, and the techniques presented here can be applied to all of them. To make the presentation of these concepts more concrete, examples and various embodiments in this document are based on cellular systems, and the terminology will correspond to the terminology used in cellular systems. Those skilled in the art will see the parallels to other wireless systems and their terminology.

Background Regarding Interference

Interference can be co-channeled when two devices within signal range of each other are operated on the same frequency channel. This is common in public and private networks due to the shortage of spectrum and the need to reuse spectrum for different cells in the same environment. Public networks try to manage this through careful cell site and frequency planning. However, it is unavoidable that reuse will cause interference in some locations. In the case of private networks in unlicensed spectrum, the co-channel interference can come from a neighboring facility, such as a factory, warehouse, or office building, that also has a private cellular system. Many of these systems operate in the Citizens Broadband Radio Service (CBRS) band as General Authorized Access (GAA) devices. These devices are not guaranteed any protection from interference, and adjacent networks may be assigned to operate on the same frequency.

Systems can also be affected by adjacent or alternate channel interference (in this document alternate includes 1st, 2nd, . . . , alternate channels, operation on any frequency that can cause interference. Signals in an adjacent or alternate channel can also create interference effects through two mechanisms. First, as transmitted, cellular signals have some spectral leakage, in which distortion and noise products from the desired signal in the intended channel are spread into the adjacent or alternate channel. Second, very strong signals in the adjacent or alternate channels can overwhelm the filtering and dynamic range of a receiver, preventing it from successfully receiving the desired signal in the desired channel.

When interference occurs, it can damage reception of the desired signals. This can have a variety of effects. In the most severe case, it can cause a complete blockage of service at a given location. More commonly it causes the data rate that can be achieved at a given location to be suppressed. Lower modulation and coding rates will be selected to achieve communication over the interference. Because interference can be intermittent depending on loads and locations of client devices, the interference can cause occasional packet loss, temporarily or periodically disrupting real time services like streaming video, or video conferencing.

The varied detrimental effects of interference make it desirable to be able to measure the extent of interference in a given location. If interference is found to be a problem, a variety of approaches to resolve or mitigate the interference are possible. These include changing the frequency channel of operation, changing the location of base stations, adjusting the orientation of directional antennas associated with the systems, adjusting the transmit power levels associated with the system, adjusting the timing or time slot usage of the systems, or similarly the frequency usage of the system.

Measuring interference is not straightforward. The interference may be well below other signals that are present, making it difficult to detect and quantify. The interference can come from any number of sources, making it difficult to determine the geolocation or other properties of the interference. The interference source could be co-channel, adjacent channel, or in the alternate channel. The interference is affected by propagation, so has different properties at each physical location. This document describes methods to detect interference that overcome these difficulties.

Method, System, and Device for Detecting Interference

The techniques presented in this document can be implemented in a number of different ways. Fundamentally what is presented is a set of methods. These methods can be implemented in a dedicated hardware device, that would then become a standalone test instrument. The method requires modest processing power, so that it can be implemented with modest processing capability, such as would be provided by a Raspberry Pi or another embedded processing system. It is also possible to perform the processing for the algorithms in the cloud. In this case, measurements would be taken by a radio placed in the test locations. Those measurements are then moved to the cloud in a raw, or partially pre-processed state. Analysis can then be performed in the cloud. In either case, the radio used for capturing the signals could be an SDR. SDRs have the advantage of being economical and flexible in the frequencies and types of signals they can capture. Similarly, the data and results can be stored locally or in the cloud. The results of the measurement and analysis can be displayed to the user on the local device, or it can be displayed through a connection to the cloud.

The result is the creation of an instrument or system that has the following capabilities:

It can show some, or all of the cellular interference, from some or all of the different interference sources.

It can identify the source of the interference, for example which cellular system, or which base station or client device (UE) from where the interference comes.

It can indicate the geographical location of the source of the interference.

It can indicate a variety of metrics of the interference, provided as a total of all interference, the total for a particular system, or broken down by each individual interferer. The metrics include:

Signal strength,

Air time above a certain signal strength level,

Frequencies occupied,

Time slots occupied,

Load or typical scheduling parameters.

The system can make measurements of interference on an ongoing basis, tracking how interference changes over time. This can be done by bringing the test equipment into the location periodically, or by installing a permanent monitoring system, potentially collocated with a base station.

All of the above can be achieved without the use of a SIM card of any type. The method does not require a SIM card for any of the interfering networks, nor does it require a SIM card for the main network that is being administered.

Definitions

In the discussion of the method, the following terminology is used:

Correlation: Correlation is a well-known mathematical process that measures similarities between two signals. There are a large number of detailed methods for calculating correlations. In addition, there are other similar algorithms that can be used to determine the strength of similarity between two signals. In this document, the term correlation is used in a general sense to refer to all of these methods and implementations.

Evaluation location: This is the location at which the interference is trying to be detected.

Sample location: This is a location at which a measurement is made which will be used to aid in finding the interference. This location is often close to a base station or other type of infrastructure device. Note that a given location can be both an evaluation location and a sample location. For example, measurements might be taken at two locations A and B. Location A might be used as a sample location to detect interference at location B. However, the measurement taken at B might then be used as a sample location for the detection of interference at location A.

RF sample: In this document, an RF sample is taken to mean a recording of the RF waveform present at a particular location across a period of time. The RF waveform is digitized, potentially as an I/Q signal, and may be filtered or have other processing applied to it before use.

Desired signal: There is a presumption that at any given location, there is a desired signal that a client device at that location would be trying to receive. Typically, this is from the closest (strongest signal) base station.

Signals from the other base stations in the environment are considered to be interference, the hope being that the interference signals are well below the desired signal, allowing the desired signal to be received.

The following are descriptions of some embodiments. Many other embodiments would be possible following the same fundamental methods.

Correlation Based on a Specific Identifier

Most wireless systems broadcast a beacon or broadcast channel to allow client devices to find them and know how to connect. These broadcast channels often include some type of identifier for the network. Three aspects of these make them beneficial for use in detecting interference. First, they are transmitted in the clear, without random scrambling, coding, or encryption. This makes it possible to know what the RF waveform will look like when they appear. Second, they often have a manageable, finite, set of possible values. An example of this type of identifier is the cell ID used in 4G and 5G cellular systems. In 4G, the cell ID can take on 504 possible values, and in 5G systems there are 1008 possible values. Third, the modulated form of these cell IDs is highly orthogonal, such that the cross correlation between one and another is low. The known waveforms, together with the modest finite set of values and low cross correlation enables the detection of which signal is present via correlation using a brute force search of all possible values.

There are a number of other advantages of using identifiers such as cell IDs to do the correlation. The broadcast channel messages (beacons in other systems) are generally sent omnidirectionally, and at full power, allowing the level of potential interference to be detected at any location on each repetition of the broadcast channel or beacon. The broadcast channel or beacon is sent periodically, whether there are client devices connected to the network, and independent of the amount of activity in the network.

The various embodiments therefore proceed as follows:

1. An RF capture is made at the location where the interference is desired to be measured (the evaluation location)

2. All potential identifiers (cell IDs) are correlated against the RF capture. This correlation can pull the interference signal out of the "noise" of other signals that might be present at that location. Several enhancements are possible to this approach.

a. If a known subset of identifiers exists at a given location, only the subset needs to be tried in the correlation. This subset could be identified from previous measurements in the environment such as a drive test, or it could be found from a database or other listing of the cell IDs by location.

b. If time alignment exists between systems, and that time alignment is known, the correlation only needs to be performed across a narrow range of time. If the systems are not time aligned, or the time alignment is not known, then the correlation needs to be performed as a sliding correlation, looking across time for correlation for each cell ID individually. In the case that the systems are not time aligned and a sliding correlation is used, one of the reported results of the system can be the current time alignment between all base stations that were detected. The time alignments can be reported relative to the timing of the desired signal.

c. Since the cell IDs are transmitted periodically with great time precision, it is possible to perform repeated correlations and summing their results. This summing could be done in the power domain, but would have greater benefit if done coherently, in the phase domain if time bases remain accurate enough. The repeated measurements can enhance the resistance of the measurement to noise or signals that are not strictly repetitive on the same time basis.

3. The signal strength of the interference, once detected by the correlation, can be determined on an absolute basis. Steps in determining the signal strength on an absolute basis include:

a. Measuring the strength of the correlation in the digital domain b. Recording the gain settings of the receiver at the time of the capture c. Decreasing the observed correlation power by the spreading gain based on the length of the correlation window d. Referring the signal strength to the antenna using the receiver gain at the time of the capture and the corrected correlation signal strength e. The absolute signal strength can then be used to determine the degree to which the interference will cause problems 4. The signal strength of the interference may also be determined on a relative basis to the desired signal, or main signal present at that same location. This can be accomplished by a. Performing the correlation with the interference signal b. Performing an equivalent correlation with the cell ID of the desired or main signal present at that location, using the cell ID for the base station to which a client at the evaluation location would connect.

c. Forming a ratio between the correlation to the interference cell ID, and the correlation to the desired cell ID.

d. Once the ratio is established, it can be used by itself to determine the relative damage that the interfering signal can do.

e. Or, if the system is able to accurately determine the absolute signal strength of the desired signal, the absolute strength of the interfering signal can be determined based on the ratio.

5. Once all the different cell IDs have been tried in correlation, the results can be presented to the user as a total, a total per cellular or wireless system, or for each individual base station (cell ID).

A great advantage to the approach of using a known identifier such as a cell ID is that results can be obtained from a single measurement in a single environment.

Correlation Based on an RF Sample

Not all wireless systems, and not all wireless signals of interest within a wireless system have a convenient identifier with the properties described above. If no identifier is available, correlation can be done against an arbitrary RF sample, taken at a location near the source of the interference. The location where the RF sample is taken is referred to as the sample location. Because the sample location is near the source of the potential interference, that RF sample will have the potentially interfering signal as the strongest, dominant element in the sample. When correlated against the signal captured at the evaluation location, the presence of the potential interferer at the evaluation location can be quantified. This method has a number of advantages.

1. No identifier is required

2. Measurements performed at the sample location can provide additional information about the potential interferer. Such information might be difficult to gather at the evaluation location since the interference signal at that location might be weak, and well below the desired signal, or other interfering signals. However, at the sample location, the potential interferer is the dominant signal, and many features of the signal can be determined just by observing signal strength at that location. The type of information that could be determined at the sample location (all without a SIM card for the network) include:

a. Air time occupied by the base station b. Frequencies occupied c. Time slots occupied d. Load across time e. Scheduling parameters f. The base station's cell ID g. Time alignment between the various base stations in the environment (assuming the measurement instruments have sufficiently stable and aligned time bases)

The RF sample correlation based approach requires multiple measurements at multiple locations. If the potential interferer is repetitive, the measurements can be taken sequentially. For example, the measurements might come from a drive test in which a continuous stream of measurements is taken as the test equipment is moved throughout a city. Evaluation locations could be selected at each point for which a given base station's signal has the greatest observed signal strength. It also could be more directed, point measurements being taken near each base station in a region, and at the evaluation location, which might also be near a base station itself. The multiple measurements might come from multiple pieces of test equipment, perhaps each installed near each of the base stations.

If there are no repetitive aspects to the signals transmitted, then the RF sample taken at the sample point and the RF capture at the evaluation point must be taken simultaneously. This requires multiple test devices, preferably with some degree of time synchronization between them to minimize the window over which correlation between the two RF captures need to be compared. This approach has the advantage that it can be applied not only to the broadcast channel transmissions, but it can also be applied to the portion of the downlink interval when the base station is communicating to the client devices. It is particularly helpful to look across the downlinking to client time period, as the base station may be altering its transmit power levels or beamforming pattern as it communicates with each client. This in turn could change the amount of interference seen at the evaluation location over time. When this type of measurement is completed, a variety of statistics regarding the results can be communicated to the user, including the average strength of interference, the maximum, the percentage of time during downlinking to clients that the interference is above a signal strength level.

Once the multiple captures have been obtained, the procedure of correlation, and derivation of signal strength and other information proceeds as described earlier, just with the correlation being done between the two RF samples, as opposed to between a known cell ID waveform and a single RF sample.

Whether performing the correlation with a known cell ID, or correlating an RF sample from a sample location, the extracted relative or absolute power of the interference at the evaluation location correctly reflects effects of distance, geometry, atmospheric absorption, shadowing, antenna gains and tilts, and all other propagation effects. This is in contrast to methods in the industry based on simulations, ray tracing, or propagation models, which cannot match the true environment in which the system operates.

Measurement of Interference from Uplink Signals

Most of the previous description can apply equally to uplink signals (those transmitted from clients to the base station), as well as downlink signals. However, some special considerations apply to measuring uplink interference.

In some systems, for example 4G and 5G cellular, there are no appropriate identifiers transmitted in the uplink signals. One of the RF sample methods of correlation must therefore be used. Similarly, there may be no regularly repeated pattern in the uplink signals, requiring the method of simultaneous capture at the sample location and the evaluation location.

Another difference is that while the interference from downlink traffic, particularly beacons or broadcast channel, will be extremely regular and consistent, devices transmitting uplink signals move about, have traffic that increases or decreases, and generally cause dynamic and highly varying interference. It is therefore important to measure this interference over time, preferably a significant period of time such as days, and to present the results in a statistical form, using statistical measures, perhaps grouped by time of day.

Wireless systems in general, and cellular systems in particular can be deployed with TDD or FDD, duplexing referring to how the uplink and downlink signals are separated from each other. In the case of TDD, a single RF sample, or multiple RF samples taken on the same frequency channel, at a given location can provide the information needed to evaluate beacon/control channel interference, downlink traffic interference, and uplink traffic interference. In an FDD system, it is necessary to perform measurements on two different frequencies to capture both the uplink and downlink interference effects. Since the uplink and downlink in an FDD system are designed not to interfere with each other, the measurement of the two different frequency ranges in an FDD system can be done sequentially, or simultaneously. It still may be required that measurements at the sample location and the evaluation location need to be made simultaneously, but those simultaneous measurements can be made at different times on the uplink and downlink frequency channels.

Adjacent and Alternate Channel Interference

As described at the beginning of this document, interference can be co-channel, or it can be coming from an adjacent or alternate channel. Co-channel interference is often the main concern, since those signals interfere directly, and are most likely to have a strong signal strength when interfering. However, given the large dynamic range over which radio systems operate, and the near-far problem in which the interfering device might be closer to the evaluation location than the device transmitting the desired signal, interference from an adjacent or alternate frequency channel can also be problematic.

The methods described in this document can be applied to adjacent and alternate channel interference. There are several methods that can work under different circumstances. First, in some modulation systems (for example older versions of Wi-Fi/802.11), it is possible to find a known identifier using cross correlation, even when looking for the signal in its adjacent or alternate channel. This works because the distortion products within the interferer's transmission that fall into the interferer's adjacent or alternate channel have sufficiently similar properties to the in-channel signal to correlate reasonably well with the known in-channel signature. Therefore, interference from adjacent or alternate channel interferers may appear even when the correlation against a specific ID method is used.

Unfortunately, this simple method will not work with many forms of modulation, and even when it does work, its sensitivity may be compromised. A second method is to perform a correlation against a specific identifier of the interferer, but to perform that correlation while listening on the adjacent or alternate channel of the evaluation location. This method has the advantage of being very sensitive to the interferer. To complete the measurement and adjustment must be made to determine the power level of the in-channel interference at the evaluation location relative to the power measured in the adjacent or alternate channel at that location. One solution for this is to use the known properties of the interferer's transmitter. The transmit spectral mask is often known for a given type of transmitter. Spectral masks are also often specified in system or regulatory requirements, and a worst-case assumption that the requirements are just barely adhered to can be used.

In the case that there are no known transmit spectral masks that can be used, the correction factor can be determined by taking a sample measurement at the sample location at which the interference signal dominates. At that location, the relative signal strength of the main signal, compared to the distortion products in the adjacent or alternate channel can be measured. This relative strength can be used as the correction factor for the results observed from adjacent or alternate channel measurements at the evaluation points.

The RF sample correlation methods described previously can also be employed directly to determine adjacent or alternate channel interference. In this case, at the sample location, where the interferer dominates, an RF sample of the spectral spreading into the interferer's adjacent or alternate channel can be taken. This direct picture of the portion of the interference that will be present co-channel at the evaluation location can then be used for cross correlation at the evaluation location. As in the previous RF sample correlation discussions, the measurement at the sample point may be taken sequentially if there is a consistent repetitive pattern in the transmission from the interferer. Alternatively, RF samples can be taken simultaneously at the sample and evaluation locations, in which case any arbitrary transmissions provide the required information.

Identifying the Location of the Source of Interference

It can be helpful to the network administrator to identify the physical location of any interference. This provides understanding of why the interference exists and increases the chances that the interference could be removed or controlled. There are a variety of enhancements to the methods already described that can allow the identification of the location of the interference.

Most directly, once a correlating specific identifier such as a cell ID is found, the location of this cell ID may be known from a database or other type of information exchange. Drive testing results may also be able to fairly accurately identify the location of transmission of the specific identifier based on examining signal strengths or angle of arrival during the drive test. Drive test type results, based on RF sample correlation as opposed to specific identifier correlation, can be used the same way. By finding the point of maximum signal strength of a particular base station during a drive test, or using a more sophisticated triangulation method, the source of the signal that is showing interference correlation can be located.

It is still possible to determine the location of the interference even if a drive test style measurement is not performed. At the evaluation location, directional antennas, multiple antennas, or an antenna array, can be used to find the angle of arrival. The signal strength determined through correlation can be used to estimate a distance if properties of the interfering transmitter and propagation path can be assumed. In combination, these can provide a location, or at least an angle, to the interferer.

Triangulation is better achieved with measurements from multiple locations. Clearly these could come from different points along a drive test in a given environment. Even without a drive test, monitoring at multiple evaluation locations may be desired, for example to assess the interference at multiple base stations within a network manager's network. The measurements at the multiple known locations of these base stations can each be correlated with the specific identifier or an RF sample. The relative magnitude of those correlations can be used to perform magnitude based triangulation to determine the source of the interferer with that specific identifier or RF signature. If phases can be aligned between the different evaluation locations, angle of arrival triangulation can also be used to help determine the location of the interference source.

In between the full drive test and evaluation point only methods, measurements could be taken in just a handful of known locations in a given environment, using the correlation method to search for a particular interferer at each of the test locations. Triangulation can then be performed through this sampling of measurement point locations in the environment.

All of the methods for triangulation can be applied equally to beacons, broadcast channels, downlink traffic, or uplink traffic. In the case of uplink traffic, it would be a client device or UE that would be located. This approach can be particularly helpful, as client devices could potentially move into a position in which they cause a lot of interference, and then remain there for an extended period of time. All of the methods previously described for making measurements of uplink interference can be enhanced with the techniques described in this section to perform location determination for each source of uplink interference.

Interference Maps

The objective is to display sources of interference as a function of geographic position. For example, understanding how base stations interfere with other base stations on the same channel. The data gathered can include of standard metrics: RSSi (Received Signal Strength Indicator), throughput, latency, packet error rate, etc.

Interference is inferred from these metrics going down. Difficult to determine as:

Metrics may go down due to factors unrelated to interference (e.g., a deep fade).

Interference is highly sensitive to traffic patterns.

Even if it is believed to be interference, there are multiple possible base stations that could be causing it.

The main approach is to label the sources of interference at a given position. Static labeling—Discover all base stations' relative strength from a given position. Dynamic labeling—Leverage multiple measurements to label interference that happens instantaneously Static Labeling Assumptions (all hold in observed deployed 5G networks, likely hold for LTE as well):

All base stations are time synchronized.

All possible interfering base stations from a given position have unique physical cell ids.

Synchronization signals can be sent omnidirectionally.

Then:

By the LTE/5G standard, synchronization signals are orthogonal and unique for different physical cell ids.

If you are synchronized to one base station, weaker correlations of a synchronization signal that are above noise are likely other base stations.

Correlation strength is proportional to the overall possible interference that other base stations can contribute.

Physical cell ids can be verified by decoding the broadcast channel.

Analysis is independent of network traffic load.

Can be done without a single UE present in the network, which makes it ideal for testing fresh deployments or new equipment.

Able to identify effects due to geometry, atmospheric absorption, etc.

Hardware requirements are very low.

Software processing can be done with a fairly low power processor (e.g., Raspberry Pi).

Static Labeling: Limitations:

Says nothing as to the frequency of interference.

MIMO could reduce overall interference of base stations.

Channel characteristics are limited to the frequency bandwidth that is allocated for the synchronization signals.

1.08 MHz for LTE.

3.6-7.2 MHz for 5G (frequency and configuration dependent).

Only able to gather data at the rate that the synchronization signals are sent (20-40 ms).

Some NSA 5G deployments do not use synchronization signals. Dynamic labeling is necessary to address these limitations.

Static Labeling: Reducing False Correlations. Because we are collecting potentially significantly weaker signals, false correlations must be handled explicitly. A correlation is likely true if:

Same physical cell id appears multiple times.

The timing offset between two measurements of the same physical cellId is one of the offsets within the stand.

Physical cell id corresponds to a very a strong correlation taken earlier (either a different time or different physical position).

Channel characteristics are similar for past measurements of the same physical cell id. Also, there are techniques to improve the overall correlation strength:

Using the channel estimation of the PSS for the SSS (including all possible PSS).

Reducing the sample rate and operating over a minimum bandwidth to cover the synchronization signals.

Adjusting the gain such that the PSS signal is maximized.

Dynamic Labeling:

Same assumptions as static labeling.

Use multiple simultaneous measurements from different positions to determine.

Some measurements are taken close to base stations, far away from the cell edge.

Use the instantaneous network traffic from one base station and compare it to another.

Energy observed that does not correlate to the strongest base station is assumed to be from another base station.

If that energy in time and frequency overlaps with the traffic pattern of an adjacent base station, then assume that is likely from that adjacent base station.

Dynamic Labeling: Advantages:

Able to analyze the entire bandwidth of the channel.

Effects due to UEs are captured (e.g., the position of the UEs, the MIMO being used, number of UEs, etc.).

Can determine how frequently interference is present.

Ideal for monitoring an environment.

Dynamic Labeling: Disadvantages

Measurement confidence is strongly correlated with the duration of the measurements.

Networks need to have a sufficient amount of traffic to see interference.

Resources costs are high.

Cellular Wireless Testing Via Monitoring OTA Messages

The following embodiments are directed to wireless testing using Over-the-Air (OTA) signals or messages.

Current 5G testing typically requires any of these: Expensive, dedicated test equipment, Coordination between users, the service provider, and the equipment vendor, SIM card is key—this allows the test equipment to get on the service provider network. That is a SIM card has keys and is used for network authentication.

According to some embodiments, a method is provided to monitor a 5G New Radio (NR) network without a SIM card, i.e., without network permission, knowledge, interaction, etc. The novelty, for example, may be associated with the algorithms for processing the obtained OTA signals.

In some implementations, a 5G NR method for detecting and decoding OTA signals may include the following and can be performed by a generic processing device, in the cloud, etc.

1. receiving raw data from monitoring one or more wireless networks at a given location e.g., no SIM card—the tester is not visible on the network but is positioned at a location for grabbing traffic in a given band of interest.

The raw data may be I and Q samples, which may be from different networks 2. decoding the raw data into meaningful messages This may involve a pseudo-snooping procedure—there is no base station cooperation, no chipset support Basically, this step may include performing a raw monitoring process independent of the one or more wireless networks and have to process the raw data into something that can be used In some cases, this may include a set of algorithms to guess and brute force fields in a message, as well as to reduce the brute force for efficiency, e.g., the guess parameters of a user can be performed until one is found that works 3. Analyzing the meaningful messages to obtain wireless parameters (or measurements)

Analyze, organize, client related information—interpreting messages into something meaningful Direction, UE, base stations, spatial—combine decoding data with multiple receivers—where problems are coming from 4. Providing measurement results from the analyzing In some embodiments, this may further include providing recommendations, reconfiguration suggestions, plans for optimization, etc.

Client Tracking

Client tracking refers to a set of capabilities associated with the cellular measurement system. The previously described advantages and capabilities of the system apply equally to this set of capabilities:

Measurements made using an inexpensive software defined radio

Measurements made without a SIM card

Measurements stored centrally on the cloud, enabling data aggregation and analysis from multiple remote locations.

However, the capabilities described within the category of client tracking are novel in and of themselves, and would be novel even if implemented in a more traditional vein.

The basic concept behind client tracking is to observe the messages sent between cellular base stations and client devices (cellular UEs). To do this without a SIM card requires a number of techniques. By observing the specific types of messages listed below, appropriately decoding and interpreting their contents, and then deriving from those messages' metrics of interest, the behavior and status of individual clients can be observed.

Because the cellular system makes some attempt to obscure the identity of the clients (for example there is not a MAC address type identifier sent in a decodable format), some tricks must be used to identify the exact device that is in communication with the base station. The identifier that is available is called the Temporary Mobile Subscription Identifier (TMSI), and the present disclosure makes use of that. However, while the TMSI stays constant for a given client over hours to a day, even as the client hands off from one base station to another, it does not necessarily stay the same when the device returns to the environment on a different day. The methods used to track a device from one day to the next are described in a separate section called "Device Tracking from Day to Day". TMSI can also change when the UE moves into a different tracking area. TMSI lifetime is defined by the operator and can vary from a few hours to days.

There are a variety of reasons that this client tracking is more difficult than one might assume at first. Some of the complications include:

Decode the downlink and particularly uplink for a given UE—which is particularly tricky to do without a SIM card for the network or being the base station Hidden and preserved states are important. It is important to observe all messages across time to track state of each user Capabilities message from UE to base station is sent encrypted, so we do not see that Similarly, it is difficult to see any reconfiguration messages sent to the UE as these are encrypted as well. These make getting the information listed below difficult and must be captured and intuited in sophisticated ways.

Information that can be gathered or derived from messages (along with the applications or "value" of those messages)

A. Connection and disconnection related

Read Directly:

Record of each time a device connects

Can be Derived:

Derive when a device disconnects via lack of activity, or perhaps by observing the very short length of the disconnect message How often a given device is connecting or disconnecting (reliability of connection)

Duration of disconnections

Periodicity of connections

If a particular device showed up on a given day

Last seen, last joined, maximum period of being offline

Value:

Monitoring worker or device presence

Monitor connection robustness for any UE

When a device was stolen from the environment

Device has lost battery power and shut down

Detect in change in periodicity of data being delivered

B. Scheduling related (pretty much same for uplink and downlink):

Read Directly:

We can see the downlink and uplink schedules

We can calculate the number of bits being transferred

We can tell if transmit power control is being used and could track the power levels being requested

MCS

MIMO usage

How often sounding being requested and sent

MU-MIMO usage

Note that messages that do the scheduling can change in their own configuration (pilot tones, format, length). These changes can be determined through an intelligent search of the possible or "predictable" configuration changes.

Can be Derived:

Data rate

Packet error rate

Uplink and downlink load

The bandwidth the base station is typically requesting each UE to use

Latency between requesting bandwidth and being granted more bandwidth

Value:

data rate(s) utilized by a given connection at any time At MAC layer, both with and without padding Quality of PHY layer link as understood by the base station/UE "Full buffer" throughput that would be possible to deliver to or from a particular UE—without running a through-put test that requires a special application or loading the network temporarily MU-MIMO usage, and the effectiveness of that Collision problems, interference, or other problems that create packet errors despite the channel being good Which devices are using a lot of data, which are loading the network heavily Observation of transmit power levels, and estimation of whether transmit power control is being done correctly, or whether transmit power control is likely an element in cell to cell interference.

Estimation of battery usage based on transmit power level

Amount of capacity being consumed by sounding

Overall load on cell (% utilization of channel/spectrum utilization)

Statistically

Across time

Actual utilization of time allocated by scheduler

Ability of the scheduler to react to varying load

C. Uplink MAC Control Elements:

Read Directly:

Buffer status report—indicates how many bytes a given client wants to transmit

The maximum power level that the client is able to transmit

Transmit power headroom (difference between current transmitting power level and the maximum that a device is able to transmit)

Can be Derived:

How much power the UE is currently transmitting, and how close that is to the UE's max Extent to which the client is not being adequately served (buffer status report)

Value:

Detect UEs that consistently/frequently have buffers that are not being cleared quickly—effectively an indication of poor latency Max power being used can be used to understand the maximum range that a client can be expected to operate over Power headroom can be used to understand the robustness a UE should have (for uplink) in its current location D. Downlink MAC Control Elements:

Read Directly:

Timing advance or delay

Carrier aggregation dictated from the base station to the UE (Secondary cell activation)

The TMSI which is the identifier that we use to connect all this information to a particular UE Can be Derived:

Total timing advance the UE is using

From total timing advance, can estimate range of client from the base station

Value:

Can estimate range of client from the base station

Can detect which devices are mobile or stationary, or potentially a failed clock in the device TMSI is used to identify a particular device (across a day, longer periods can be done but require additional techniques). Allows all stats, measurements, etc. to be recorded by device, and mapped to a particular device in the environment Carrier aggregation activation by the base station E. Radio Link Control:

Read Directly:

Can get the ACKs and NACKs (these are helpful as may not see all hybrid ARQ retransmissions, so serves as cross check to the packet error rate)

Can be Derived:

Higher level packet failure rate

Value:

Higher level packet failure rate

F. PDCP (Packet Data Convergence Protocol):

Read Directly:

Encryption mode

Encryption capabilities of UE

Packet signatures

Value:

Whether appropriate security is being used in the network

Whether each client is using that appropriate security

Detection of rogue AP or UE: If had a SIM card for the network, could verify that the base station is valid. If have base station key, then can verify that all the UEs in the network are valid.

G. Non-Access Stratum Message (NAS): Sent as part of the RRC message. Most of it is transmitted in the clear. For 4G it contains the IMSI (global unique identifier), in 5G it is SUCI.

Read Directly:

Either IMSI or TMSI (4G), or SUCI (for 5G)

Can be Derived:

With IMSI can identify the device directly, always (fixed unique identifier)

SUCI can identify each client uniquely on that base station.

By tracking the SUCI and the TMSI, we can learn the SUCI for a given client at each and every base station in an environment as it roams. Therefore, if the TMSI is varying, it will no longer matter as we can identify the device using the SUCI Capturing the SUCI requires observing the public key that is transmitted by the client.

Value:

Can be used to identify particular client devices across long periods of time, including periods of time over which the TMSI might change.

Device tracking from day to day—because the TMSI can change on a day to day basis, need a way to associate a device present on the network yesterday with one TMSI, to the same device on the network today using a different TMSI. There are several possible ways to do this:

Use a data source to stimulate messages to known clients, observe by time correlation what TMSI those messages are being delivered with Some networks (base stations) may be able to deliver a mapping from the TMSI's to a MAC address Each client uses a single particular public key. We might be able to get this information either from the network administrator, or from the SIM card itself (it may not be encrypted). What key is being used to transmit a message from the client is sent in the clear.

Use LTE SIM cards (whether on 5G network or 4G network) in which case the IMSI is transmitted in the clear the first time that the device connects. The base station could either kick it off triggering a reconnection, or we could observe the device connecting naturally when it comes into the environment. In the case that a new TMSI is being issued to device we are already tracking, and for which we know the old TMSI, we will be able to observe and track the new TMSI being assigned in the case of LTE SIM cards. 5G SIM cards do not allow this.

Use other means to identify devices, for example properties relating to their behavior, traffic patterns, configuration, connection/disconnection pattern, data use pattern, encryption modes supported, wireless capabilities, etc.

Use an unlocked SIM card, program them with keys that we know—this would give us full access, essentially eliminating the encryption. (This cannot work for a device on a public network. It cannot work for a neighbor network, and it puts the system into an element of network management issuing the SIM cards. However, perhaps the SIM cards could be used only temporarily while debugging a problem?)

Additional Applications of Client Tracking

Bandwidth Inspection—Because you can see the schedule of a network, you can observe what bandwidth is not being used, and inspect (or "steal") that bandwidth for use in another network. The unused network capacity can be characterized by the time frequency matrix, and some of those time/frequency slots are not used, which can be observed. Ways to make use of this empty capacity:

Operate an overlapping 5G or 4G network, in which the scheduling of traffic is done into the time/frequency slots that are observed to be open (according to the schedule) of the overlapping neighboring network.

Operating Wi-Fi network, much as described as well. Frequency channel use can be selected to take advantage of the observed schedule, and Wi-Fi traffic can be scheduled using CTS to self or other known methods to induce the equivalent of TDMA scheduling within a Wi-Fi network.

Receive only Cellular Clients (or Users)—If there is a set of devices that do not need to transmit (example is turning on and off a light bulb) but need to receive. However, normally cellular client devices (UEs) need to transmit in order to connect to the network, remain on the network, etc. However, in this case, a single centralized transmitter could spoof the transmissions for an entire set of IoT devices (for example in a home). It can do this by observing the schedules and knowing when the IoT device would have been required to transmit and by transmitting for the given IoT device at the required times. Effectively a given IoT device would be delegating its transmission requirements to another device that might be plugged in or centralized. This would save both cost and power in the IoT device.

Traffic Identification—By observing the patterns of transmissions and receptions, for example, the length of packets the frequency of packets etc., it is possible to determine what type of traffic or application (Netflix, YouTube, etc.) is in use. The information about the transmissions and receptions comes from observing the scheduling messages, and this is used to intuit the usage. Similar to application identification, it might be possible to identify activities, for example the arrival of a train or bus. Another example would be tracking user movement and activity in shopping malls.

General Wireless Network Testing Method

FIG. 19 is a flow diagram illustrating an embodiment of a method 300 for inspecting OTA signals for analyzing a wireless network. The method 300 includes receiving data captured from monitoring raw signals from one or more wireless networks at a given location (step 302); decoding the data to determine messages in the raw signals (step 304); analyzing the determined message to determine network parameters that define a status of the one or more wireless networks (step 306); and presenting the determined network parameters for the one or more wireless networks at the given location (step 308).

The monitoring raw signals is performed by a device that excludes a Subscriber Identity Module (SIM). The raw signals can include In-phase (I) and Quadrature (Q) components of Over-the-Air (OTA) signals transmitted within a wireless network of the one or more wireless networks, the OTA signals being wirelessly transmitted between a base station and one or more User Equipment (UE) devices. Because of the lack of a SIM card (authentication), the decoding is performed without a combination of message length, message format, message scheduling, and Radio Network Temporary Information (RNTI). The decoding is performed via observations from transmissions to other clients, uplink network traffic, and associated search algorithms, as described herein.

The analyzing can include determining physical layer, modulation, and protocol information from the determined messages and calculating the network parameters therefrom, the network parameters include performance related metrics. The network parameters can include supportable Modulation and Coding Scheme (MCS) and supportable Multiple Input Multiple Output (MIMO), each determined from the monitored raw signals. The network parameters can include load which is estimated based on a comparison of Reference Signal Received Quality (RSPQ) and Reference Signal Received Power (RSRP). The network parameters can include interference which is estimated using the monitored raw signals.

The method 300 can further include providing feedback regarding performance of the one or more wireless networks, the feedback can include any of synchronization of base stations and any errors, values for preamble settings and selections, Public Land Mobile Network (PLMN) identifiers, 4G and 5G optional features, Modulation and Coding Scheme (MCS) tables, and carrier aggregation. The method 300 can further include providing recommendations related the one or more wireless networks, including detection of anomalous configurations or behaviors.

The determined network parameters can include initial associations, roaming/handoff problems or delays, clients consuming excessive resources, and clients in wrong bands or in sub-optimal modes. The determined network parameters can include localization of signals, including interfering devices, noise sources, poorly behaving clients, and clients or base stations in neighboring systems, wherein the localization is performed via triangulation, direction-of-arrival, and a combination thereof.

The method 300 can be performed in a cloud or a processing device located separate from a device for monitoring the raw signals, and the presenting includes providing a User Interface (UI). The monitoring can be via a Software-Defined Radio (SDR).

Conclusion

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A method comprising steps of:
   receiving data captured from monitoring raw signals from one or more wireless networks at a given location, wherein the raw signals comprise digitized components of Over-the-Air (OTA) signals wirelessly transmitted between a base station and one or more User Equipment (UE) devices of the one or more wireless networks, and wherein the monitoring is performed by a device that (i) is not authenticated on the one or more wireless networks and (ii) excludes a Subscriber Identity Module (SIM);
   decoding the data to determine messages in the raw signals, wherein the decoding is performed without credentials that would be provided by a SIM card and without decrypting a message that contains one or more of message length, message format, message scheduling, and Radio Network Temporary Information (RNTI);
   analyzing the determined messages to determine network parameters that define a status of the one or more wireless networks; and
   presenting the determined network parameters for the one or more wireless networks at the given location.

2. The method of claim 1, wherein the monitoring raw signals and the decoding the data is performed without any information related to the one or more wireless networks other than observable information based on listening to the OTA signals, and wherein the decoding is performed on control, diagnosis, metadata, and signaling data of the OTA signals rather than on payload data.

3. The method of claim 1, wherein the device that excludes the SIM comprises a Software-Defined Radio (SDR) configured to capture the digitized components of the OTA signals, and a computing system coupled to the SDR.

4. The method of claim 1, wherein the decoding is performed without decrypting a message that contain a combination of message length, message format, message scheduling, and Radio Network Temporary Information (RNTI), the decoding comprising applying search algorithms to determine at least one of the message length, the message format, the message scheduling, and the RNTI based on observations from downlink or uplink network traffic.

5. The method of claim 1, wherein the monitoring raw signals and decoding the data is performed without encryption keys for the one or more wireless networks.

6. The method of claim 4, wherein the decoding is performed via search algorithms operating on observations from client specific downlink or uplink network traffic.

7. The method of claim 1, wherein the analyzing includes determining physical layer, modulation, and protocol information from the determined messages and calculating the network parameters therefrom, the network parameters include performance related metrics.

8. The method of claim 1, wherein the network parameters include supportable Modulation and Coding Scheme (MCS) and supportable Multiple Input Multiple Output (MIMO), each determined from the monitored raw signals.

9. The method of claim 1, wherein the network parameters include network capacity.

10. The method of claim 1, wherein the network parameters include load which is estimated based on a comparison of Reference Signal Received Quality (RSPQ) and Reference Signal Received Power (RSRP).

11. The method of claim 1, wherein the network parameters include load estimated based on observation of network traffic patterns or schedules.

12. The method of claim 1, wherein the network parameters include interference which is estimated using the monitored raw signals.

13. The method of claim 12, wherein the interference parameters include signal strength and time utilization.

14. The method of claim 12, wherein the interference parameters are shown for individual interfering base stations or networks.

15. The method of claim 1, wherein the steps further include:
   providing feedback regarding performance of the one or more wireless networks, the feedback including any of synchronization of base stations and any errors, values for preamble settings and selections, Public Land Mobile Network (PLMN) identifiers, 4G and 5G optional features, Modulation and Coding Scheme (MCS) tables, and carrier aggregation.

16. The method of claim 1, wherein the steps further include:
   providing recommendations related the one or more wireless networks, including detection of anomalous configurations or behaviors.

17. The method of claim 1, wherein the determined network parameters include:
   initial associations, roaming/handoff problems or delays, clients consuming excessive resources, clients with high packet error rates, and clients in wrong bands or in sub-optimal modes.

18. The method of claim 1, wherein the determined network parameters include:

localization of signals, including any of interfering devices, noise sources, poorly behaving clients, and clients or base stations in neighboring systems, wherein the localization is performed via triangulation, direction-of-arrival, and a combination thereof.

19. A non-transitory computer-readable medium configured to store computer logic having instructions that enable one or more processing devices to perform steps of:

receiving data captured from monitoring raw signals from one or more wireless networks at a given location, wherein the raw signals comprise digitized components of Over-the-Air (OTA) signals wirelessly transmitted between a base station and one or more User Equipment (UE) devices of the one or more wireless networks, and wherein the monitoring is performed by a device that (i) is not authenticated on the one or more wireless networks and (ii) excludes a Subscriber Identity Module (SIM);

decoding the data to determine messages in the raw signals, wherein the decoding is performed without credentials that would be provided by a SIM card and without decrypting a message that contains one or more of message length, message format, message scheduling, and Radio Network Temporary Information (RNTI);

analyzing the determined messages to determine network parameters that define a status of the one or more wireless networks; and presenting the determined network parameters for the one or more wireless networks at the given location.

20. A system comprising:

one or more processing devices; and memory configured to store a computer program having instructions that, when executed, cause the one or more processing devices to perform steps of receiving data captured from monitoring raw signals from one or more wireless networks at a given location, wherein the raw signals comprise digitized components of Over-the-Air (OTA) signals wirelessly transmitted between a base station and one or more User Equipment (UE) devices of the one or more wireless networks, and wherein the monitoring is performed by a device that (i) is not authenticated on the one or more wireless networks and (ii) excludes a Subscriber Identity Module (SIM);

decoding the data to determine messages in the raw signals, wherein the decoding is performed without credentials that would be provided by a SIM card and without decrypting a message that contains one one or more of message length, message format, message scheduling, and Radio Network Temporary Information (RNTI);

analyzing the determined messages to determine network parameters that define a status of the one or more wireless networks; and presenting the determined network parameters for the one or more wireless networks at the given location.

* * * * *